United States Patent
Soejima

(10) Patent No.: US 9,418,638 B2
(45) Date of Patent: Aug. 16, 2016

(54) MUSIC SCORE DISPLAY DEVICE, MUSIC SCORE DISPLAY METHOD, AND PROGRAM STORAGE MEDIUM

(71) Applicant: CASIO COMPUTER CO., LTD., Shibuya-ku, Tokyo (JP)

(72) Inventor: Junichiro Soejima, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/491,866

(22) Filed: Sep. 19, 2014

(65) Prior Publication Data

US 2015/0082974 A1 Mar. 26, 2015

(30) Foreign Application Priority Data

Sep. 20, 2013 (JP) .................................. 2013-195732

(51) Int. Cl.
*G10H 1/00* (2006.01)
*G10H 1/36* (2006.01)
(Continued)

(52) U.S. Cl.
CPC ................ *G10H 1/0008* (2013.01); *G09B 5/06* (2013.01); *G09B 15/00* (2013.01); *G09B 15/002* (2013.01); *G09B 15/023* (2013.01); *G10H 1/00* (2013.01); *G10H 1/36* (2013.01); *G10H 7/00* (2013.01); *G10H 2220/015* (2013.01); *G10H 2220/096* (2013.01)

(58) Field of Classification Search
CPC ...... G09B 15/00; G09B 15/02; G09B 15/023; G10H 1/00; G10H 1/36; G10H 7/00
USPC .................................. 84/634, 609, 60, 477 R
See application file for complete search history.

(56) References Cited

U.S. PATENT DOCUMENTS 5,604,322 A * 2/1997 Kikuchi ............... G09B 15/001
84/463
5,728,960 A * 3/1998 Sitrick ................. G09B 15/023
84/464 R
(Continued)

FOREIGN PATENT DOCUMENTS

JP 10133639 A 5/1998
JP 2003177745 A 6/2003
(Continued)

OTHER PUBLICATIONS

Japanese Office Action (and English translation thereof) dated Oct. 6, 2015, issued in counterpart Japanese Application No. 2013-195732.
(Continued)

*Primary Examiner* — Elvin G Enad
*Assistant Examiner* — Christina Schreiber
(74) *Attorney, Agent, or Firm* — Holtz, Holtz & Volek PC

(57) ABSTRACT

The CPU in a music score display device includes: a source region setting unit that sets a source region based on a desired portion designated in a music score displayed on a screen, the source region of the music score being an object to be enlarged and displayed; a display destination region setting unit that sets a display destination region of the screen, the display destination region corresponding to the source region; and a display control unit that extracts the music score in the source region, and enlarges and displays the extracted music score in the display destination region on the screen.

10 Claims, 29 Drawing Sheets

(51) Int. Cl.
  *G10H 7/00*   (2006.01)
  *G09B 15/00*  (2006.01)
  *G09B 15/02*  (2006.01)
  *G09B 15/06*  (2006.01)
  *G09B 5/06*   (2006.01)

(56) References Cited

U.S. PATENT DOCUMENTS

| | | | | |
|---|---|---|---|---|
| 5,825,905 | A * | 10/1998 | Kikuchi | G06K 9/033 382/113 |
| 5,883,970 | A * | 3/1999 | Kikuchi | G06K 9/033 382/113 |
| 6,166,313 | A * | 12/2000 | Miyamoto | G09B 15/04 84/477 R |
| 6,380,471 | B2 * | 4/2002 | Matsumoto | G10G 1/00 84/477 R |
| 6,541,687 | B1 * | 4/2003 | Miyamoto | G09B 15/08 84/477 R |
| 7,271,329 | B2 * | 9/2007 | Franzblau | G09B 5/02 84/454 |
| 7,365,261 | B2 * | 4/2008 | Hirano | G10H 1/0008 84/470 R |
| 7,851,689 | B2 * | 12/2010 | Reynolds | G09B 15/00 84/609 |
| 8,378,194 | B2 * | 2/2013 | Daisy | G09B 5/06 84/470 R |
| 8,921,678 | B2 * | 12/2014 | Usui | G10H 1/0025 84/600 |
| 8,975,500 | B2 * | 3/2015 | Iriyama | G10H 1/0008 84/483.1 |
| 9,129,583 | B2 * | 9/2015 | Little | G10H 1/0016 |
| 2001/0023633 | A1 * | 9/2001 | Matsumoto | G09B 15/023 84/478 |
| 2003/0005814 | A1 * | 1/2003 | Matsumoto | G09B 15/02 84/477 R |
| 2003/0097640 | A1 * | 5/2003 | Abrams | G06F 17/241 715/255 |
| 2009/0301287 | A1 * | 12/2009 | Harvey | G10H 1/0025 84/609 |
| 2011/0259176 | A1 * | 10/2011 | Pillhofer | G09B 15/002 84/470 R |
| 2012/0222540 | A1 * | 9/2012 | Usui | G10H 1/0025 84/622 |
| 2012/0247305 | A1 * | 10/2012 | Katsuta | G09B 15/023 84/477 R |
| 2012/0250941 | A1 * | 10/2012 | Katsuta | G06K 9/00 382/103 |
| 2014/0283668 | A1 * | 9/2014 | Soejima | G09B 15/002 84/477 R |
| 2015/0082974 | A1 * | 3/2015 | Soejima | G10H 1/0008 84/609 |
| 2015/0095822 | A1 * | 4/2015 | Feis | G10G 1/00 715/765 |

FOREIGN PATENT DOCUMENTS

| | | |
|---|---|---|
| JP | 3463515 B2 * | 11/2003 |
| JP | 2003345346 A | 12/2003 |
| JP | 2004341693 A | 12/2004 |

OTHER PUBLICATIONS

Japanese Office Action (and English translation thereof) dated May 31, 2016, issued in counterpart Japanese Application No. 2013-195732.

* cited by examiner

FIG. 3

| scoreCtrl | nowPage | PAGE BEING CURRENTLY DISPLAYED |
|---|---|---|
| | scrX | SCORE DISPLAY START COORDINATE IN x-DIRECTION ON DISPLAY |
| | scrY | SCORE DISPLAY START COORDINATE IN y-DIRECTION ON DISPLAY |
| | scrSX | SCORE DISPLAY WIDTH ON DISPLAY |
| | scrSY | SCORE DISPLAY HEIGHT ON DISPLAY |
| | PageCount | PAGE NUMBER |
| | Bitmap[PageCount] | IMAGE DATA OF EACH PAGE |
| | Scale | DISPLAY MAGNIFICATION RELATIVE TO SOURCE IMAGE |
| | x | DISPLAY START COORDINATE IN x-DIRECTION IN SOURCE IMAGE |
| | y | DISPLAY START COORDINATE IN y-DIRECTION IN SOURCE IMAGE |
| | SX | DISPLAY WIDTH IN x-DIRECTION IN SOURCE IMAGE |
| | SY | DISPLAY HEIGHT IN y-DIRECTION IN SOURCE IMAGE |

FIG. 5

| | Field | Description |
|---|---|---|
| Meas[0] | Page | PAGE NUMBER |
| | Rect | RECTANGULAR COORDINATES (Left/Top/Right/Bottom) OF MEASURE IN SOURCE IMAGE |
| | Shelf | STAVE NUMBER |
| | TopR | y-COORDINATE OF UPPERMOST LINE OF STAVE FOR RIGHT-HAND PART IN SOURCE IMAGE |
| | BottomR | y-COORDINATE OF LOWERMOST LINE OF STAVE FOR RIGHT-HAND PART IN SOURCE IMAGE |
| | TopL | y-COORDINATE OF UPPERMOST LINE OF STAVE FOR LEFT-HAND PART IN SOURCE IMAGE |
| | BottomL | y-COORDINATE OF LOWERMOST LINE OF STAVE FOR LEFT-HAND PART IN SOURCE IMAGE |
| | time | TIME AT TOP OF MEASURE |
| | gate | LENGTH (DURATION) OF MEASURE |
| Meas[1] | | |
| | ... | |
| Meas[N] | | |
| | ... | |

FIG. 6

| | | |
|---|---|---|
| Note[0] | Time | SOUND START TIME |
| | Gate | SOUND DURATION |
| | Pitch | PITCH |
| | Track | TRACK NUMBER (1: RIGHT HAND, 2: LEFT HAND) |
| | Meas | MEASURE NUMBER |
| | x | x-COORDINATE OF HEAD IN SOURCE IMAGE |
| | y | y-COORDINATE OF HEAD IN SOURCE IMAGE |
| Note[1] | | |
| | ... | |
| Note[N] | | |
| | ... | |

MUSIC SCORE DISPLAY DEVICE, MUSIC SCORE DISPLAY METHOD, AND PROGRAM STORAGE MEDIUM

CROSS-REFERENCE TO RELATED APPLICATIONS

This application is based upon and claims the benefit of priority from the prior Japanese Patent Application No. 2013-195732, filed Sep. 20, 2013, and the entire contents of which are incorporated herein by reference.

BACKGROUND OF THE INVENTION

1. Field of the Invention

The present invention relates to a music score display device that displays a desired music score on a screen, and a music score display method and a program storage medium that are used in the music score display device.

2. Description of the Related Art

There has been a known music score display device that displays a desired music score in a predetermined position on a screen, and sequentially updates the music score as the performance progresses (see JP 3463515 B1, for example).

Where a music score is displayed on the above mentioned conventional music score display device, it is hard to see details in the music score displayed in a large area that is set as the predetermined position for enhanced visibility of the entire music score. Particularly, in a music score of a piece involving a number of parts, the distances between the staves for the respective parts are short, and the distances between the lines in each stave are even much shorter. In such a state, it is difficult to recognize the pitches of the respective notes, and it is very hard to see the notes as well as other various elements of musical notation. If a small area in a music score is enlarged and displayed so as to clearly see details, however, the screen fails to show the entire score, resulting in poorer visibility.

SUMMARY OF THE INVENTION

The present invention has been made in view of the above aspects, and aims to provide a music score display device that can enlarge and display only a portion designated by a user to examine without a reduction in visibility of the entire music score, a music score display method, and a program storage medium.

A music score display device according to the present invention includes: a designating unit that designates a desired portion of a music score displayed on a display screen; a source region setting unit that sets a source region in the music score based on the portion designated by the designating unit, the source region in the music score being an object to be enlarged and displayed; a display destination region setting unit that sets a display destination region of the display screen, the display destination region being separate from the source region; and a display controlling unit that enlarges and displays in the display destination region a partial music score included in the source region the partial music score being a part of the music score included in the source region.

BRIEF DESCRIPTION OF THE DRAWINGS

FIG. 3 is a diagram showing control variables pertaining to the display screen of the music score display device according to the first embodiment;

FIG. 5 is a diagram showing the structure of measure information in the music score display device according to a first embodiment;

FIG. 6 is a diagram showing the structure of execution information in the music score display device according to a first embodiment;

FIG. 25A is a diagram showing an example of a music score of a piece involving two parts, and FIG. 25B is a diagram showing an example of a music score of a piece involving three parts;

DETAILED DESCRIPTION OF THE PREFERRED EMBODIMENTS

The following is a description of embodiments of the present invention, with reference to the accompanying drawings.

(First Embodiment)

Figure 1:
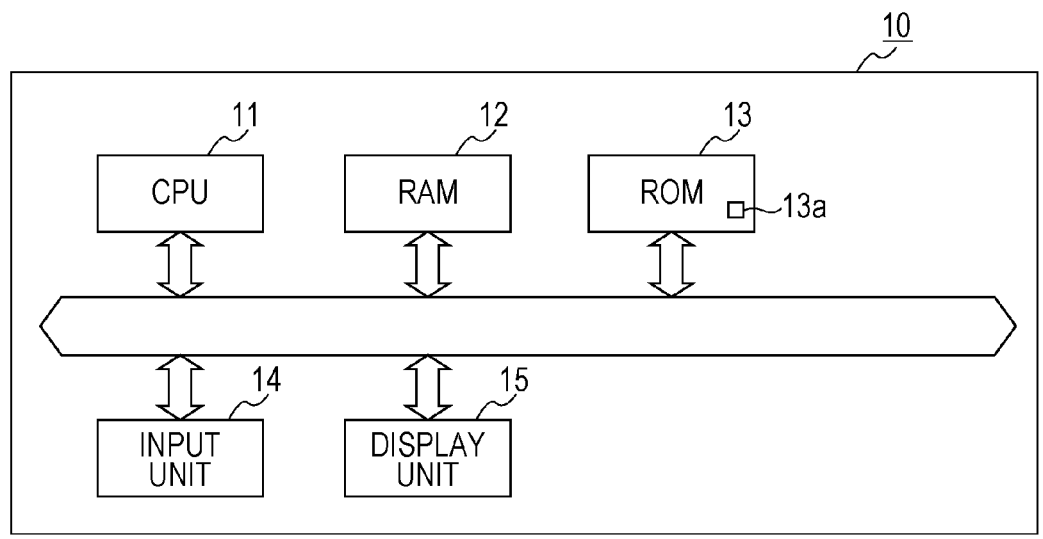
FIG. 1 is a block diagram showing the structure of a music score display device according to a first embodiment of the present invention.

FIG. 1 is a block diagram showing the structure of a music score display device according to a first embodiment of the present invention; Reference numeral 10 in the drawing indicates the entire music score display device.

The music score display device 10 is formed with a PC (personal computer), for example. This music score display device 10 includes a CPU 11 as the main control unit, and a RAM 12, a ROM 13, an input unit 14, a display unit 15, and the like, which are connected to the CPU 11.

The CPU 11 starts various programs 13a stored in the ROM 13, and performs respective processes in accordance with events that are input through the input unit 14. In this embodiment, this CPU 11 has various kinds of functions for realizing music score display (see FIG. 2).

The RAM 12 stores various kinds of data necessary for the processes to be performed by the CPU 11. In this RAM 12, the later described image data and execution information about music scores are stored. The ROM 13 stores the various programs 13a and the like. The various programs 13a include a program for controlling music score display according to the present invention.

The input unit 14 is an input device such as a keyboard and a mouse. The input unit 14 generates events in accordance with input operations of the user, and supplies the events to the CPU 11. The display unit 15 is formed with a display device such as an LCD (Liquid Crystal Display) that is capable of displaying color images, and has a screen of a predetermined size. In this embodiment, a touch panel is used as the input unit 14, and the touch panel is placed on the screen of the display unit 15, for example.

Figure 2:
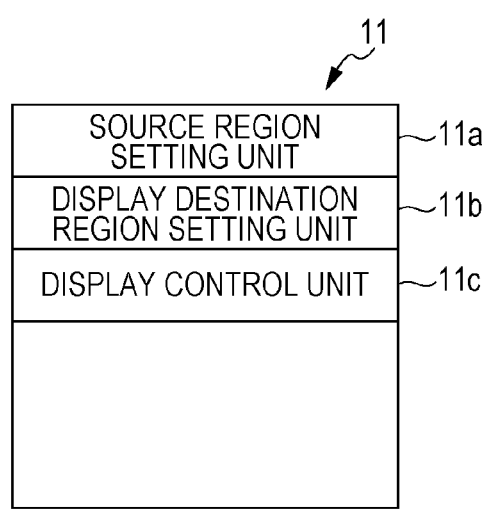
FIG. 2 is a block diagram showing the functional structure of the CPU provided in the music score display device according to the first embodiment.

FIG. 2 is a block diagram showing the functional structure of the CPU 11. The CPU 11 includes a source region setting unit 11a, a display destination region setting unit 11b, and a display control unit 11c as the functional components pertaining to music score display.

When a subject portion is designated in a music score displayed on the screen, the source region setting unit 11a sets a source region in which an enlarged image of the music score stored in the RAM 12 is to be displayed based on the designated portion. The display destination region setting unit 11b sets the display destination region corresponding to the source region set by the source region setting unit 11a on the screen. The display control unit 11c extracts the music score from the source region, and displays an enlarged image of the extracted music score in the display destination region set by the display destination region setting unit 11b on the screen.

FIG. 3 is a diagram showing control variables pertaining to the display screen. The variables in the respective drawings described below are examples realized by variables defined by structural types and classes.

As the control variables pertaining to the display screen, "page being currently displayed", "time previously designated", "score display start coordinate in x-direction on display", "score display start coordinate in y-direction on display", "score display width on display", "score display height on display", "page number", "image data of each page", "display magnification relative to source image", "display start coordinate in x-direction in source image", "display start coordinate in y-direction in source image", "display width in x-direction in source image", and "display height in y-direction in source image" are defined by the variables shown in FIG. 3. The data pertaining to these variables are stored in a display screen control area (not shown) in the RAM 12, for example.

Figure 4:
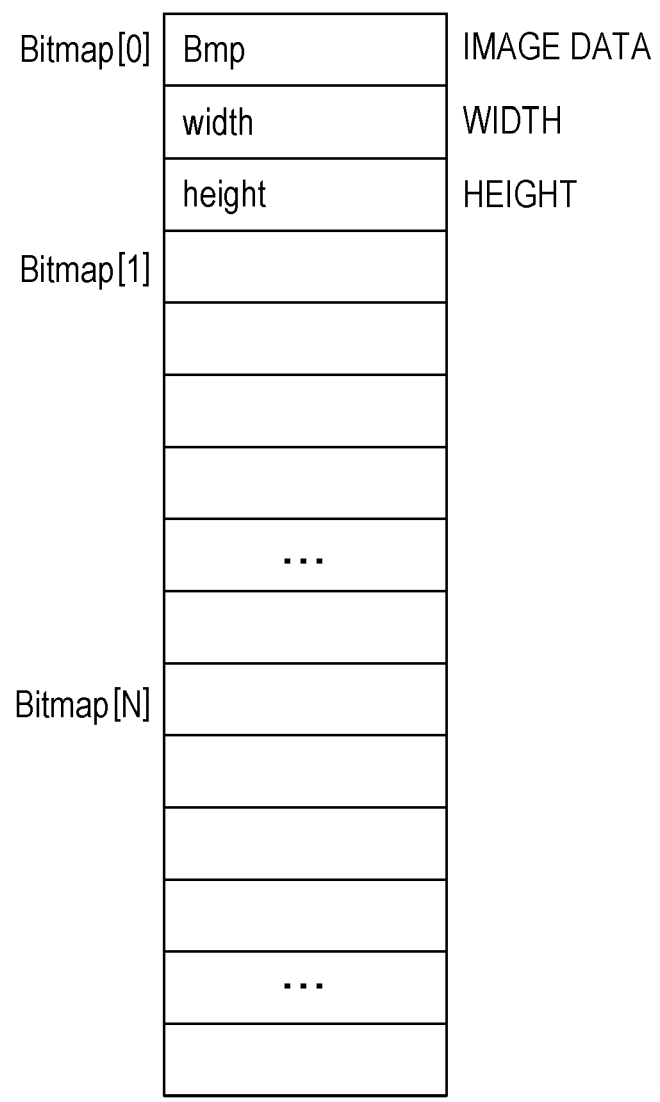
FIG. 4 is a diagram showing control variables pertaining to a music score image in the music score display device according to the first embodiment.

FIG. 4 is a diagram showing control variables pertaining to a music score image.

As the control variables pertaining to a music score image, "image data", "width", and "height" are defined by the variables shown in FIG. 4. The data pertaining to these variables are stored in a score image control area (not shown) in the RAM 12, for example.

FIG. 5 is a diagram showing the structure of measure information.

Data of music scores are managed on a measure-by-measure basis. N of "Meas[N]" in the drawing indicates a measure number. Of each measure, "page number (if any)", "rectangular coordinates (Left/Top/Right/Bottom) of measure in source image", "stave number", "y-coordinate of uppermost line of stave for right-hand part in source image", "y-coordinate of lowermost line of stave for right-hand part in source image", "y-coordinate of uppermost line of stave for left-hand part in source image", "y-coordinate of lowermost line of stave for left-hand part in source image", "time at top of measure", and "length (duration) of measure" are defined by the variables shown in FIG. 5, and the data pertaining to these variables are stored in a measure management area (not shown) in the RAM 12, for example. Since a piano score (two staves) is described as an example here, the y-coordinates of the staves for the right hand and the left hand are stored. In the case of a music score with a larger number of staves than that, the position of the uppermost and lowermost lines of each stave may be stored, for example.

FIG. 6 is a diagram showing the structure of execution information.

Execution information is the information for converting each note in the score to sound, and is managed on a note-by-note basis.

N of "Note[N]" in the drawing indicates a note number. Of each note, "sound start time", "sound duration", "pitch", "track number (1: right hand, 2: left hand)", "measure number", "x-coordinate of head in source image", "y-coordinate of head in source image" are defined by the variables shown in FIG. 6, and the data pertaining to these variables are stored in an execution information management area (not shown) in the RAM 12, for example.

For ease of comprehension, a specific example of an enlarged score display method of the present invention will be described below prior to a description of operation of the music score display device 10.

Figure 7:
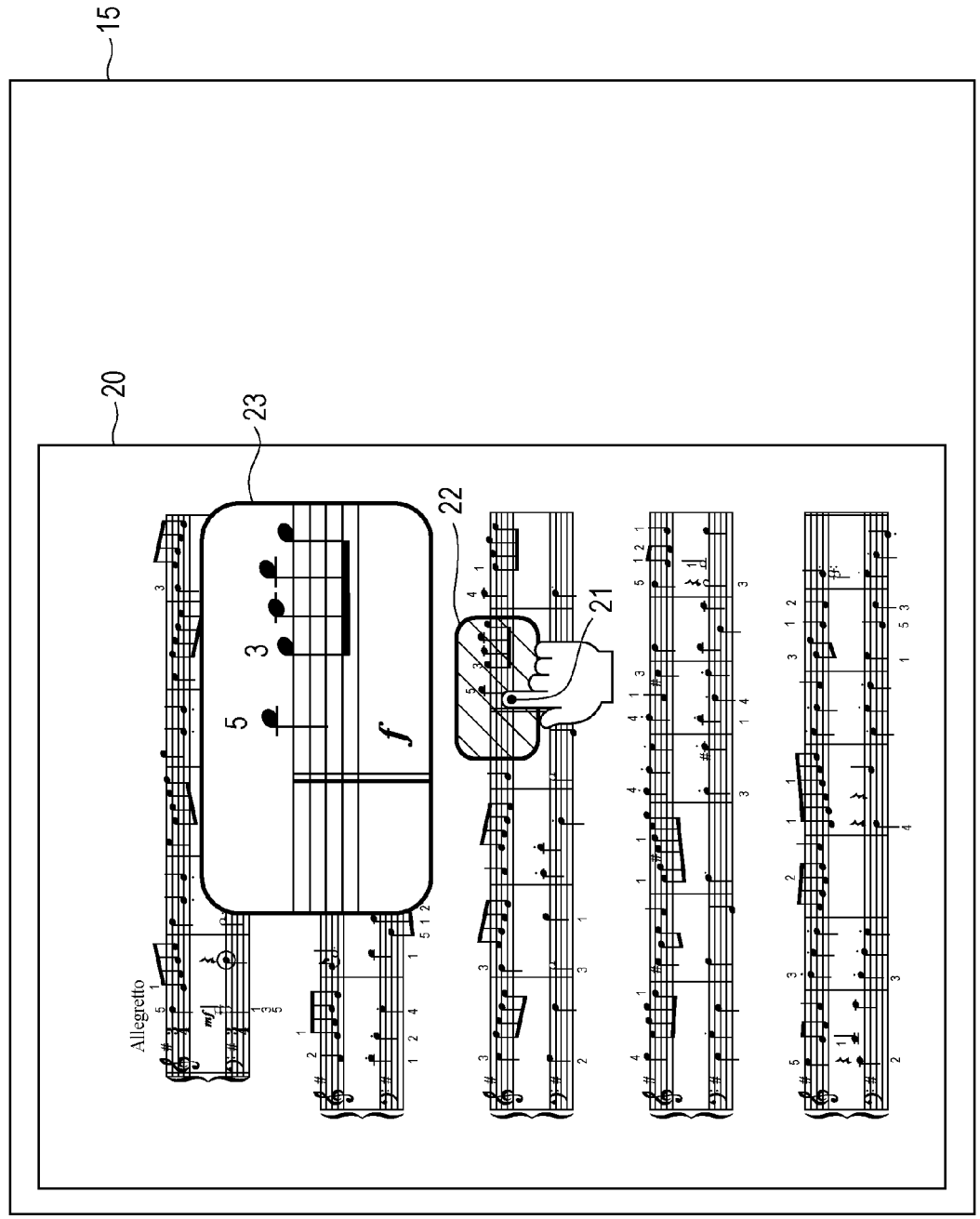
FIG. 7 is a diagram illustrating the relationship between an enlarged display source region and a display destination region that are set in the music score image currently displayed on the music score display device according to the first embodiment.

FIG. 7 is a diagram illustrating the relationship between an enlarged display source region and a display destination region that are set in the currently displayed music score image.

In the drawing, reference numeral 20 indicates the music score image. This music score image 20 is an image of a music score formed with staves (two staves in this example), and is displayed in a predetermined size on the screen of the display unit 15. When the user touches and designates a desired portion 21 of the music score image 20 on the screen with a finger, a rectangular source region 22 based on the designated portion 21 and a rectangular display destination region 23 corresponding to the source region 22 are set.

The source region 22 indicates the region to be enlarged for display in the music score image 20. The display destination region 23 indicates the region in which an enlarged image is to be displayed. After the source region 22 and the display destination region 23 are set, the portion of the music score image 20 in the source region 22 is extracted, is enlarged, and is displayed in the display destination region 23. At this point, the source region 22 is filled with a predetermined color (the shaded portion in the drawing).

In the first embodiment, the source region 22 has a fixed size, with the designated portion 21 being its center. The display destination region 23 is set in a place that is near the designated portion 21 and does not overlap the source region 22. However, if the display destination region 23 sticks out of the range of the music score image 20, it is moved to some other place. An example of such a case is shown in FIG. 8.

Figure 8:
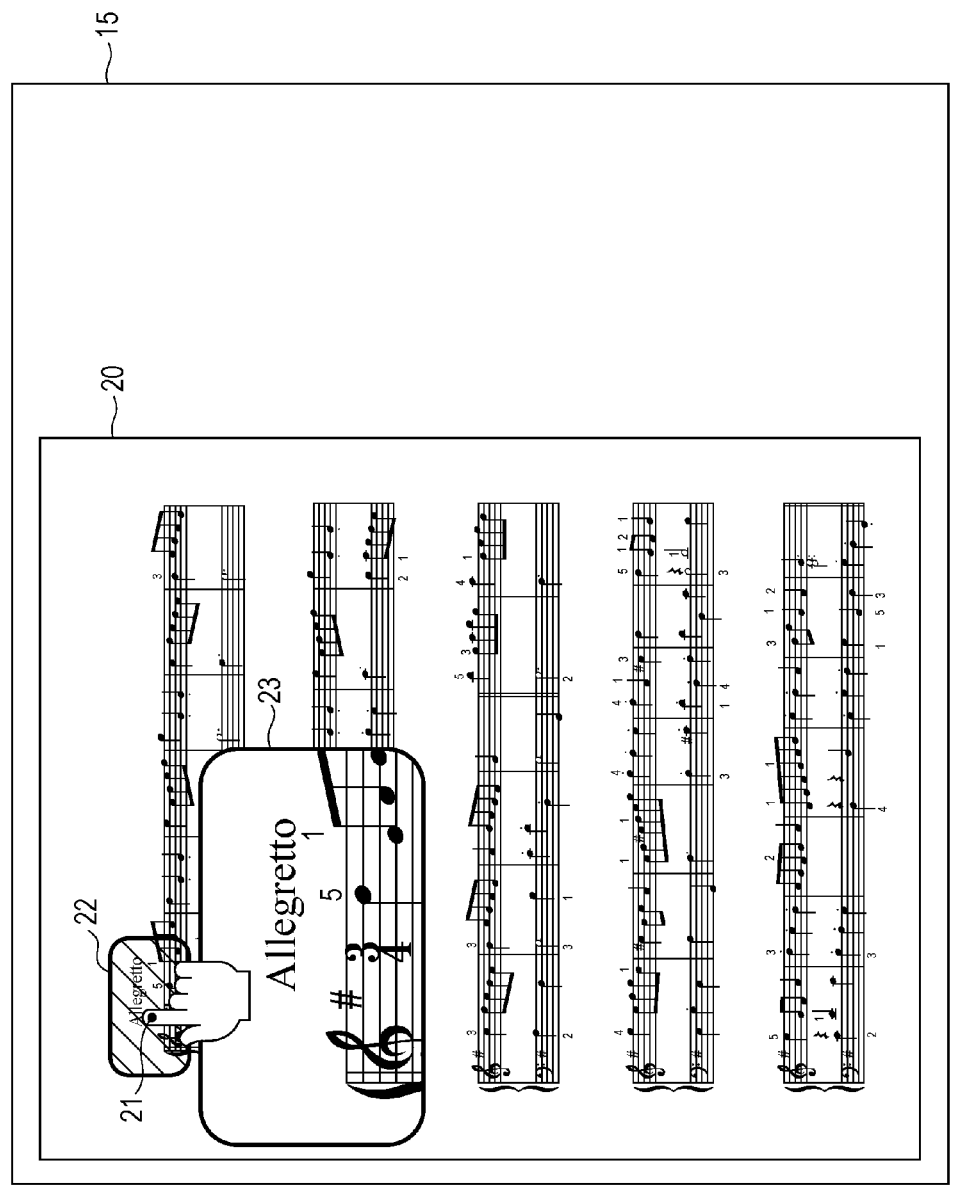
FIG. 8 is a diagram illustrating the relationship between an enlarged display source region and a display destination region that are set in the music score image currently displayed on the music score display device according to the first embodiment.

FIG. 8 is a diagram illustrating the relationship between an enlarged display source region and a display destination region that are set in the currently displayed music score image, and shows an example case where the display destination region is set below the designated portion.

For example, the user touches and designates a portion near the upper edge of the music score image 20 on the screen with a finger.

In such a case, if the display destination region 23 is set above the source region 22 based on the designated portion 21, the display destination region 23 sticks out of the range of the music score image 20. Therefore, the display destination region 23 is set below the source region 22.

In the description below, operation of the music score display device 10 of the first embodiment will be described in detail, divided into (a) a main process, (b) a score image display process, and (c) a partially enlarged display process. The processes shown in the respective flowcharts described below are performed by the CPU 11 of the music score display device 10 reading the programs 13a stored in the ROM 13.

(a) Main Process

Figure 9:
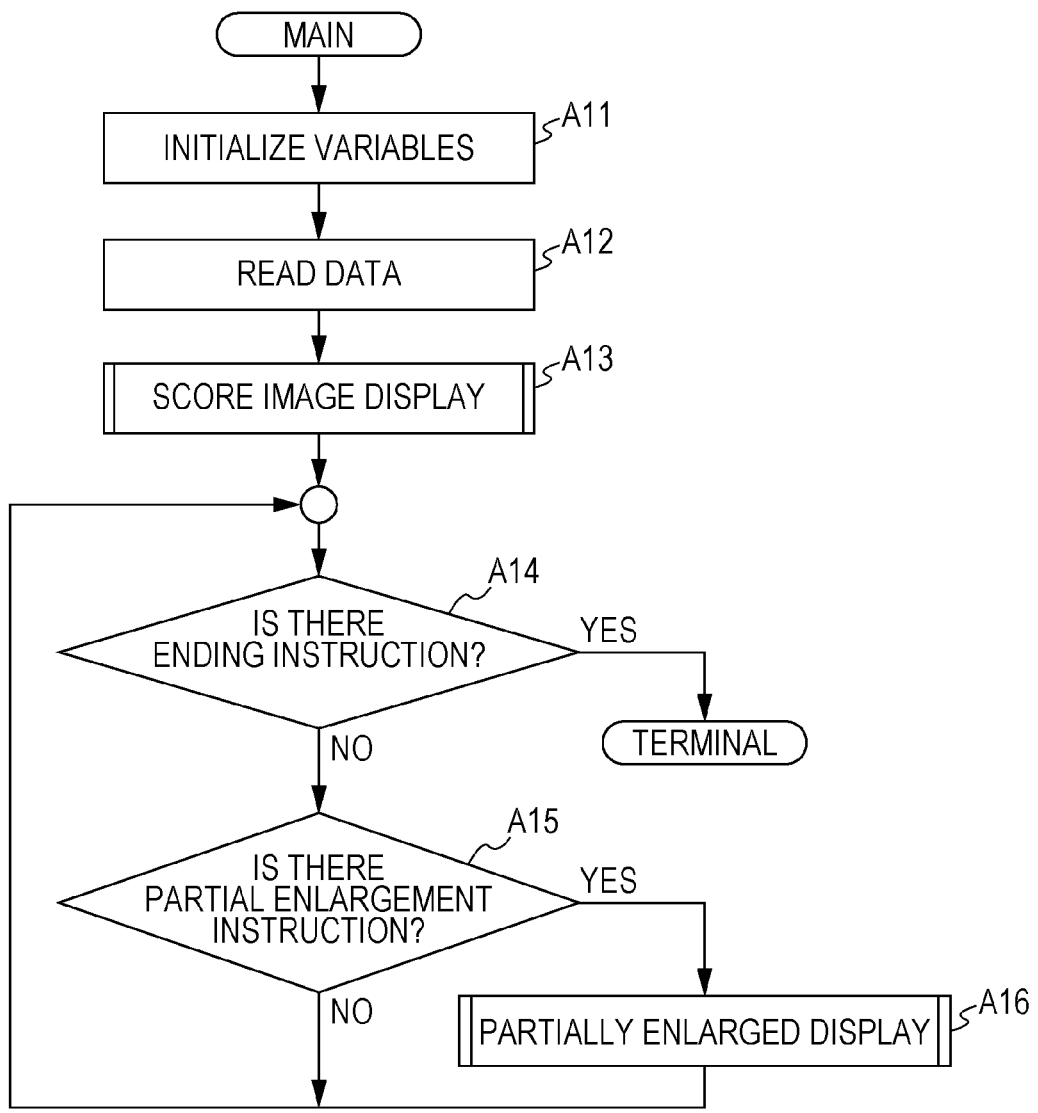
FIG. 9 is a flowchart showing the main process to be performed by the CPU of the music score display device according to the first embodiment.

FIG. 9 is a flowchart showing the main process to be performed by the CPU 11 of the music score display device 10.

First, in the initialization when power supply is started, the CPU 11 initializes the respective control variables shown in FIGS. 3 through 6 as necessary (step A11), reads the image data of a music score selected by a predetermined operation from the RAM 12 (step A12), and displays the image data on the screen of the display unit 15 (step A13). This procedure will be described later in detail, with reference to FIG. 10.

If partial enlargement is designated through a user touch operation (Yes in step A15), the CPU 11 enlarges and displays part of the currently displayed music score image 20 (step A16). This partially enlarged display process will be described later in detail, with reference to FIG. 12 and others.

If an ending instruction is issued through a predetermined operation (Yes in step A14), the series of procedures comes to an end.

(b) Score Image Display Process

Figure 10:
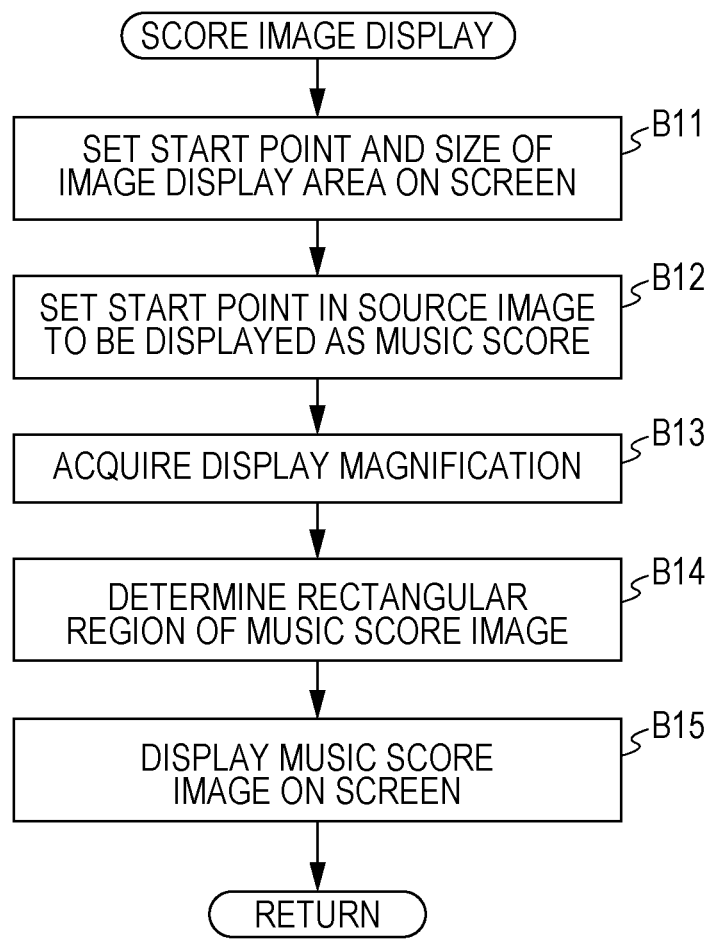
FIG. 10 is a flowchart showing the score image display process to be performed in step A13 shown in FIG. 9 according to the first embodiment.

FIG. 10 is a flowchart showing the score image display process to be performed in step A13 shown in FIG. 9.

Figure 11:
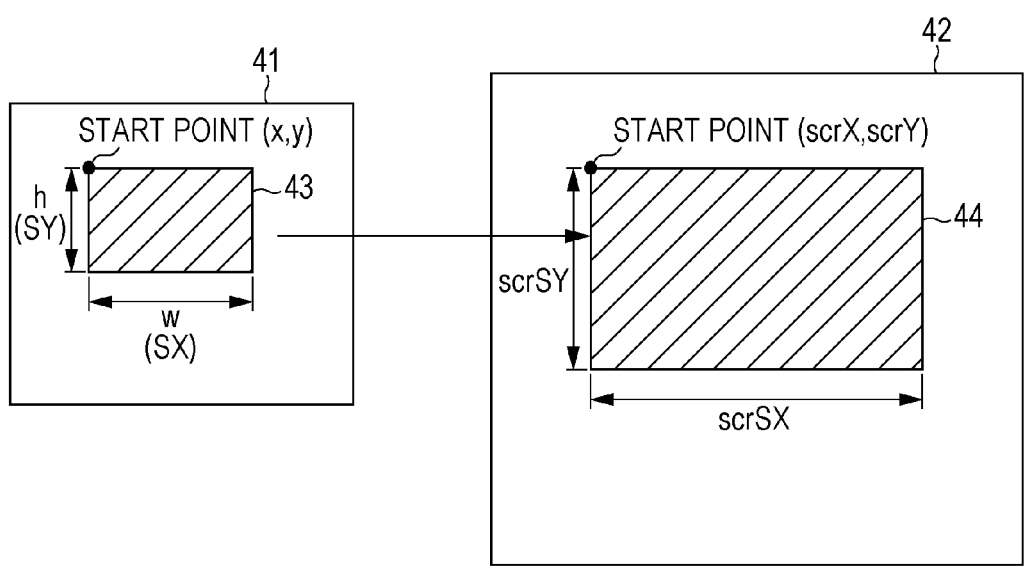
FIG. 11 is a diagram illustrating the relationship between a source image to be used as a music score image and the display screen of the music score display device according to the first embodiment.

As shown in FIG. 11, part of a source image 41 to be used as a music score image is displayed on a display screen 42 (the screen of the display unit 15), for example. The respective variables are defined as shown in FIG. 3. For simplification, however, the structure names (such as scoreCtrl in FIG. 3) will be omitted as appropriate, and explanation will be made only with member variables.

First, the CPU 11 sets the start-point coordinates (scrX, scrY) and the horizontal and vertical sizes (scrSX, scrSY) of an image display area 44 in the display screen 42 (step B11). For example, the image display area 44 is set based on a predetermined score display area of the window of an application being operated in the PC. The CPU 11 then sets the coordinates (x, y) of the start point in the source image 41 to be displayed as a music score (step B12). Specifically, the coordinates (x, y) of the start point are set in accordance with the page number and the measure number of the score to be currently displayed, for example.

The CPU 11 then acquires the display magnification (Scale) relative to the source image 41 (step B13), determines the rectangular region to be displayed as a music score from the source image 41 in accordance with the display magnification (step B14), and displays the image 43 of the rectangular region as the music score image 20 in the image display area 44 on the display screen 42 (step B15).

Specifically, an image portion of a size calculated by converting the horizontal and vertical sizes (scrSX, scrSY) to be displayed on the screen from the start-point coordinates (x, y) set in step B12 in the source image 41 based on the user setting or the display magnification (Scale) set by an application is determined to be the rectangular region to be displayed as an image, and the rectangular region is enlarged/reduced at the display magnification (Scale), to display the image in the image display area 44 on the display screen 42.

Through the series of procedures shown in FIG. 10, part of the source image 41 to be used as a music score image is displayed on the display screen 42 (the screen of the display unit 15).

(c) Partially Enlarged Display Process

Figure 12:
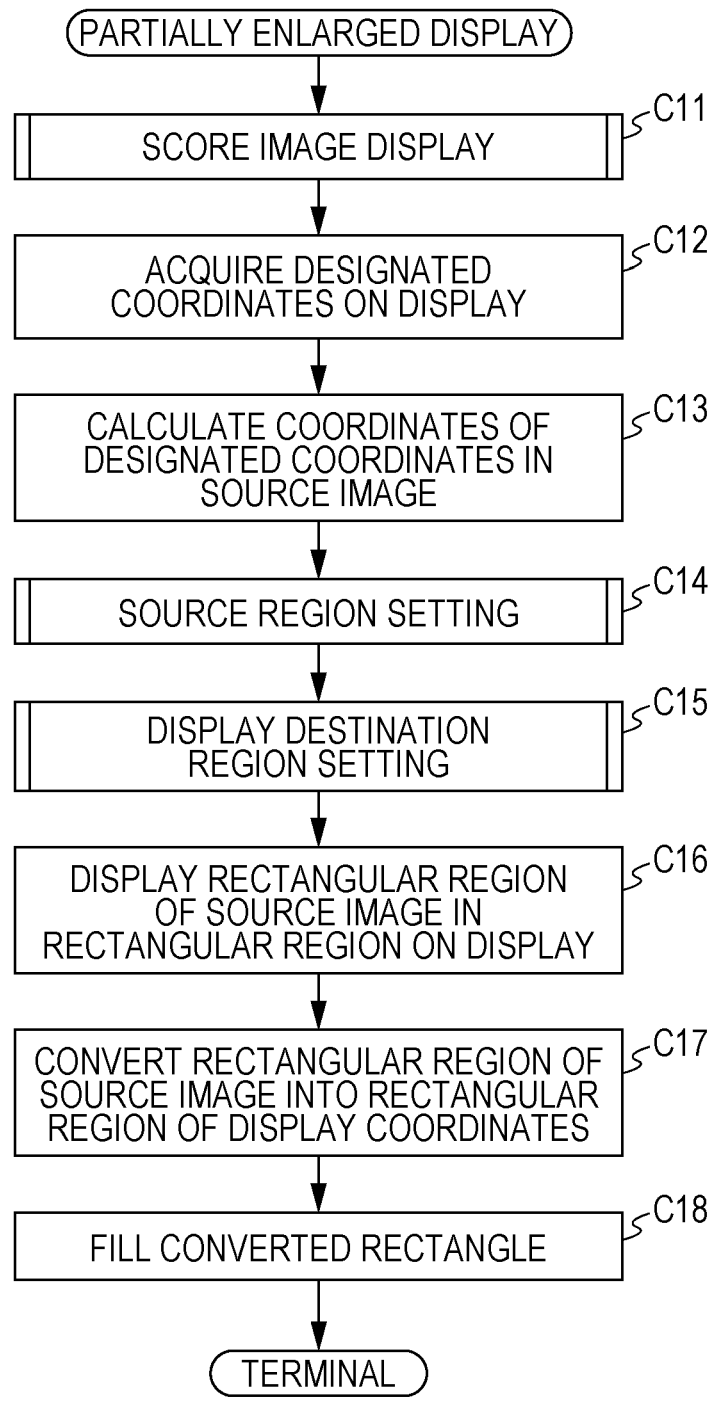
FIG. 12 is a flowchart showing the partially enlarged display process to be performed in step A16 shown in FIG. 9 according to the first embodiment.

FIG. 12 is a flowchart showing the partially enlarged display process to be performed in step A16 shown in FIG. 9.

While a desired music score image 20 is displayed on the screen of the display unit 15 through the above described score image display process shown in FIG. 10 (step C11), the CPU 11 performs the process described below.

Specifically, the CPU 11 acquires the designated coordinates of the portion 21 designated by the user on the display screen 42 (the screen of the display unit 15) based on touch-panel input positional coordinates information (step C12), and converts the designated coordinates into coordinates in the source image 41 (step C13) More specifically, the CPU 11 calculates the coordinates corresponding to the designated coordinates on the display screen 42 in the source image 41 based on the correlation between the source image 41 and the display screen 42 shown in FIG. 11.

In the coordinate system of the source image 41, the CPU 11 performs a source region setting process (step C14) for setting the source region 22 to be enlarged and displayed based on the portion 21 designated by the user (the designated coordinates), and a display destination region setting process (step C15) for setting the display destination region 23 for the source region 22. The source region setting process will be described later in detail, with reference to FIG. 13. The display destination region setting process will be described later in detail, with reference to FIGS. 16 and 17.

After setting the source region 22 and the display destination region 23, the CPU 11 extracts the source region 22 of the music score image 20 from the source image 41, and enlarges and displays the source region 22 in the region corresponding to the display destination region 23 on the display screen 42 (step C16).

The CPU 11 then converts the rectangular region of the source region 22 in the source image 41 into coordinates on the display screen 42 (step C17), and fills the region corresponding to the source region 22 with a predetermined color, to distinguish the region from the other regions (step C18). Accordingly, which portion of the music score image 20 is to be enlarged and displayed can be visually recognized.

The source region setting process and the display destination region setting process will be described below in greater detail. It should be noted that these processes are performed by using the coordinate system of the source image 41.

(Source Region Setting Process)

Figure 13:
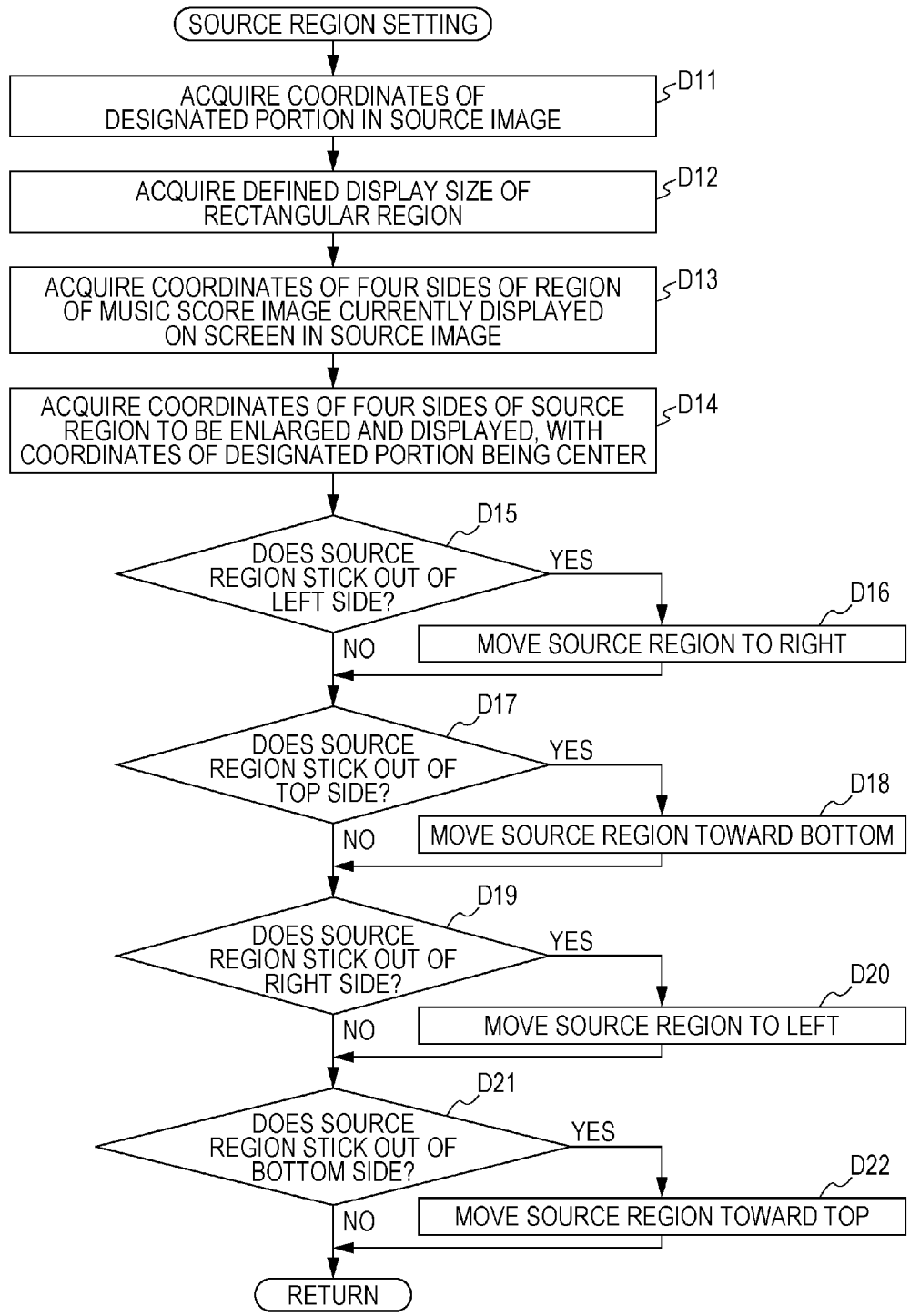
FIG. 13 is a flowchart showing the source region setting process to be performed in step C14 shown in FIG. 12 according to the first embodiment.

FIG. 13 is a flowchart showing the source region setting process to be performed in step C14 shown in FIG. 12.

First, the CPU 11 acquires the coordinates of the portion 21 (the x-y coordinates of the designated point), which has been designated by the user on the display screen 42 (the screen of the display unit 15), in the source image 41 (step D11). Specifically, the touched position on the display screen 42 is detected by a touch panel, and the coordinates of the touched position are calculated as the positional coordinates corresponding to the touched position in the source image based on the correspondence relation between the source image 41 and the display screen 42. The CPU 11 then acquires the defined display size of a rectangular region (step D12). Specifically, the range (width/height) of an image to be displayed around a position designated by a user is defined beforehand, for example, and the defined size is read.

The CPU 11 then acquires the coordinates (the x-coordinates of the right and left sides, and the y-coordinates of the top and bottom sides) of the four sides (the right side, the left side, the top side, and the bottom side) corresponding to the image region of the music score currently displayed on the screen in the source image 41 (step D13), and acquires the coordinates of the four sides (the right side, the left side, the top side, and the bottom side) of the source region 22 (rectangular region), which is the region to be enlarged and displayed, with the coordinates of the designated portion 21 being the center (step D14).

Figure 14:
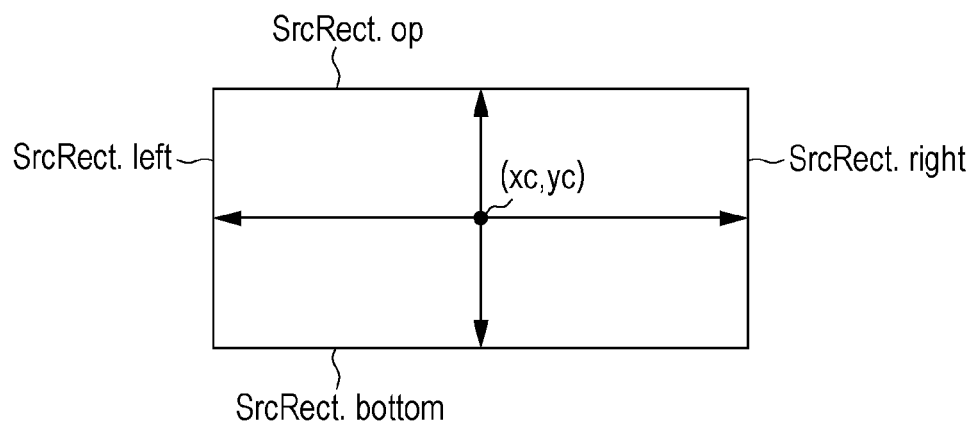
FIG. 14 is a diagram for explaining a source region that is set through the source region setting process according to the first embodiment.

An example of such a situation is shown in FIG. 14.

If the coordinates of the designated portion 21 in the source image 41 are (xc, yc), the rectangular region of the defined display size centering around the coordinates is obtained as the source region 22 indicating the range of the enlarged display. The coordinates of the four sides (the right side, the left side, the top side, and the bottom side) of the source region 22 (the rectangular region) are defined as "SrcRect.right, SrcRect.left, SrcRect.top, SrcRect.bottom".

The CPU 11 then determines whether the source region 22 obtained in step D14 is within the region of the currently displayed music score image acquired in step D13. If the source region 22 is within the music score image region, the source region 22 is fixed in the position of the current coordinates.

If the source region 22 is not within the music score image region, the source region 22 sticks out of the currently displayed music score region, and therefore, the CPU 11 corrects the coordinates of the position of the source region 22 so that the source region 22 falls within the music score image region. Specifically, if the source region 22 sticks out of the left side of the music score image region (Yes in step D15), for example, the CPU 11 moves the source region 22 to the right by the amount equivalent to the sticking-out portion (step D16).

Figure 15:
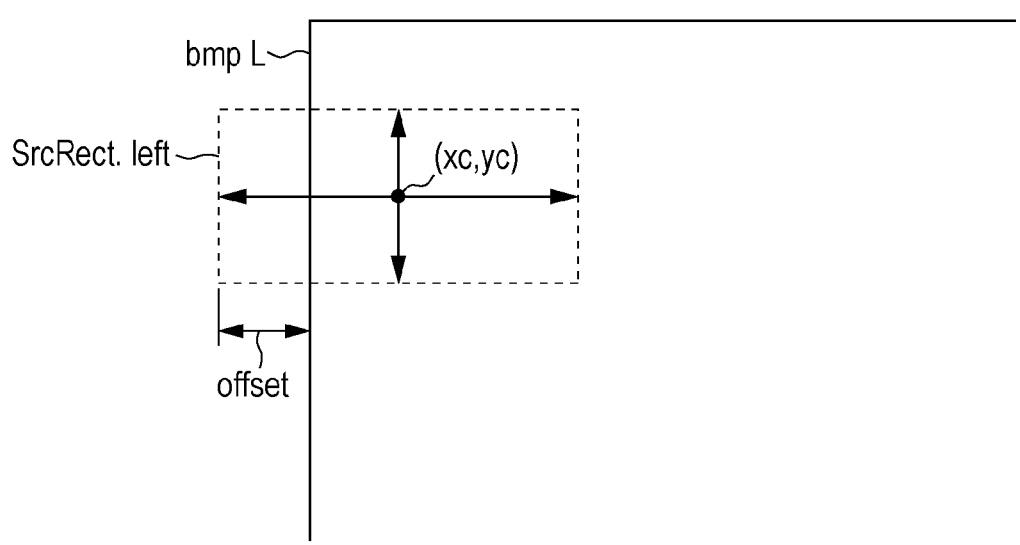
FIG. 15 is a diagram for explaining a situation where the source region sticks out of the left side of the music score image region in the first embodiment.

An example of such a situation is shown in FIG. 15.

In a case where the source region 22 sticks out of the left side (bmp L) of the music score image region, the source region 22 is moved to the right, with the sticking-out portion being the correction amount (Offset).

Likewise, if the source region 22 sticks out of the top side of the music score image region, the CPU 11 moves the source region 22 toward the bottom (steps D17 and D18). If the source region 22 sticks out of the right side of the music score image region, the CPU 11 moves the source region 22 to the left (steps D19 and D20). If the source region 22 sticks out of the bottom side of the music score image region, the CPU 11 moves the source region 22 toward the top (steps D21 and D22). In this manner, the coordinates of the source region 22 are corrected so as to fall within the music score image region.

Through the above described process, the source region to be enlarged is set in the source music score image.

(Display Destination Region Setting Process)

Figure 16:
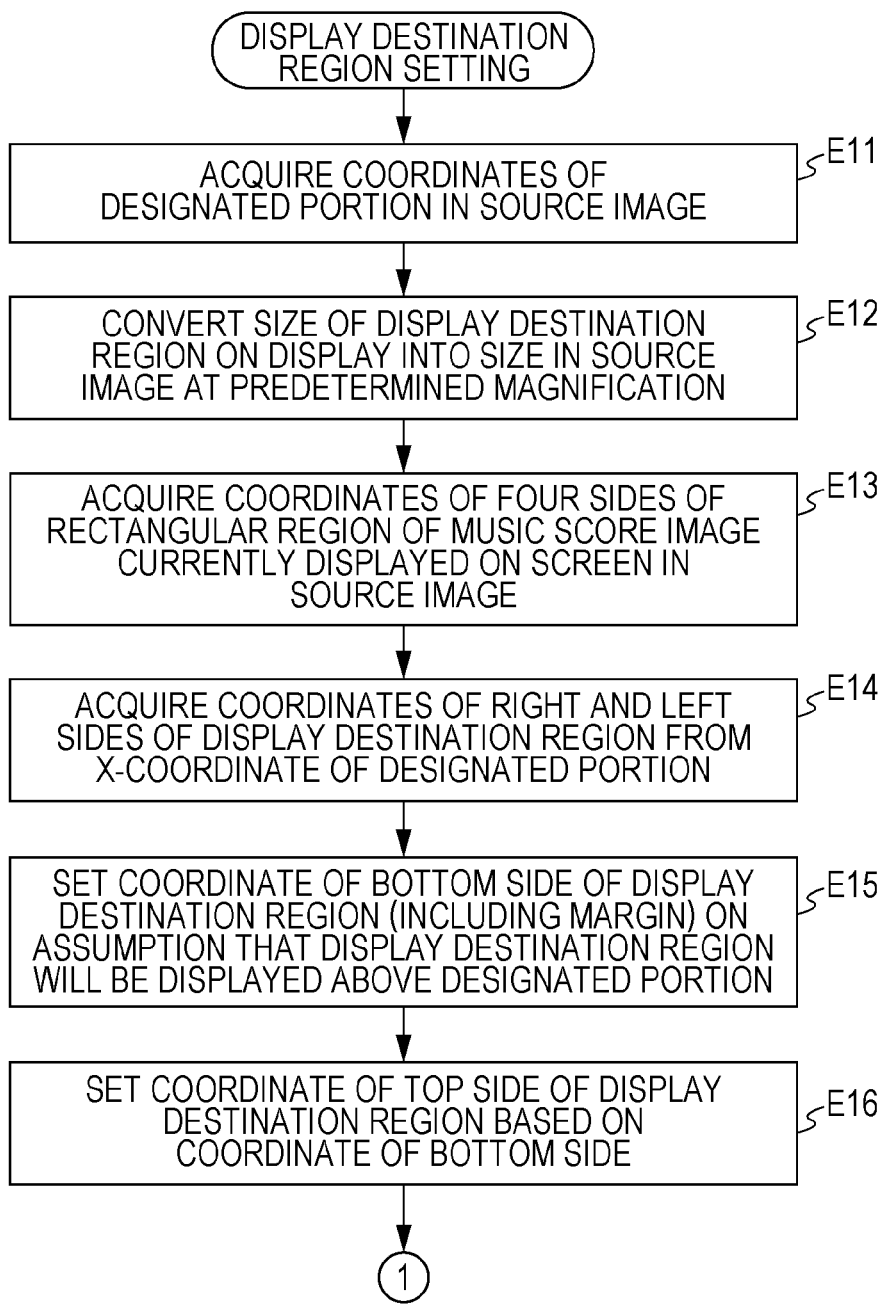
FIG. 16 is a flowchart showing the display destination region setting process to be performed in step C15 shown in FIG. 12 according to the first embodiment.
Figure 17:
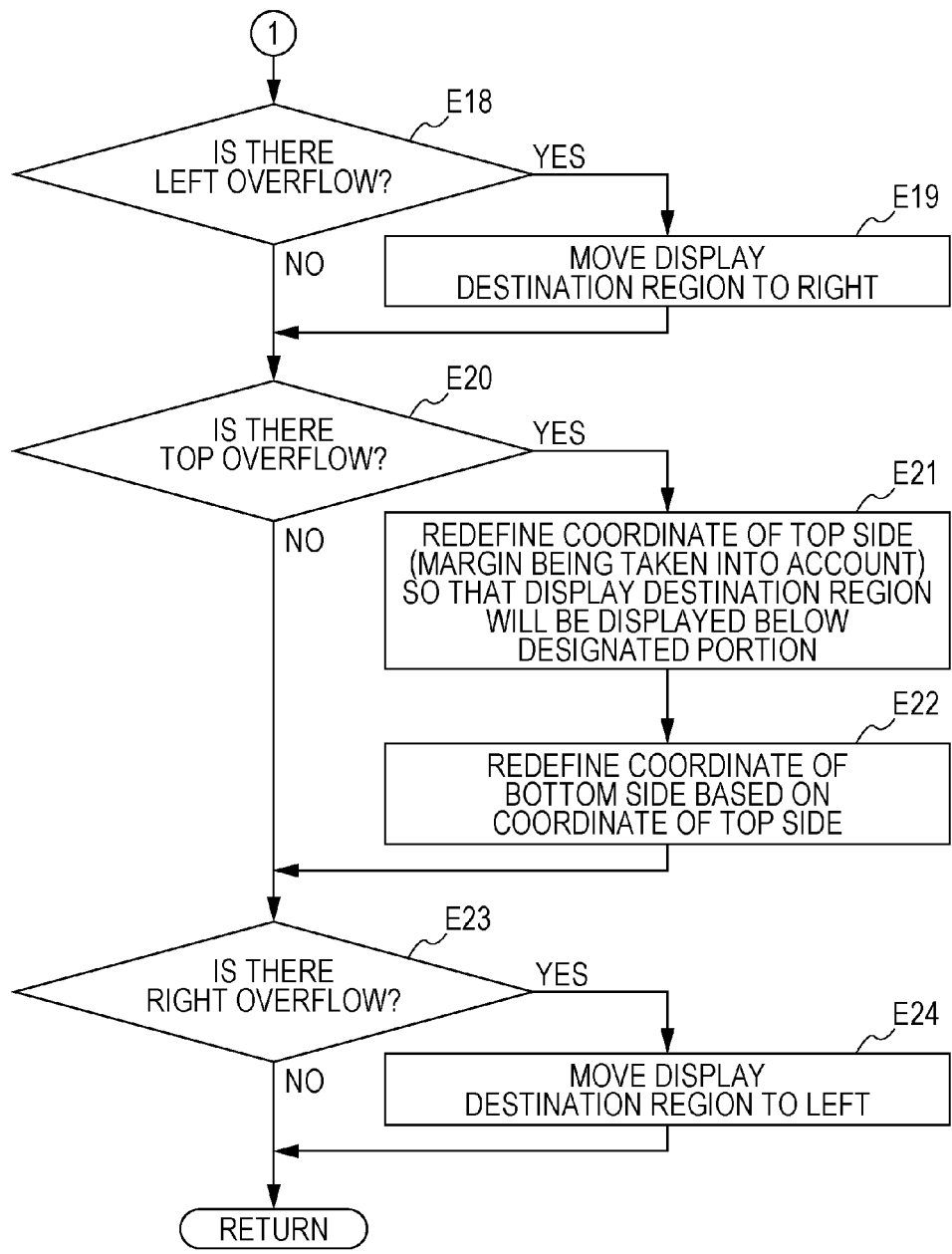
FIG. 17 is the continued flowchart showing the display destination region setting process to be performed in step C15 shown in FIG. 12 according to the first embodiment.

FIGS. 16 and 17 are a flowchart showing the display destination region setting process to be performed in step C15 shown in FIG. 12.

First, the CPU 11 acquires the coordinates of the portion 21 (the x-y coordinates of the designated point), which has been designated by the user on the display screen 42 (the screen of the display unit 15), in the source image 41 (step E11). The CPU 11 also replaces the size of the display destination region for enlarged display on the display screen 42 with a size in the source image 41 at a predetermined magnification (step E12). Specifically, the size of the display region on the display screen 42 is converted into the size in the source image 41 based on the display magnification (Scale) of the display image relative to the source image as determined in step B13.

The CPU 11 then acquires the coordinates (the x-coordinates of the right and left sides, and the y-coordinates of the top and bottom sides) of the four sides (the right side, the left side, the top side, and the bottom side) corresponding to the image region of the music score currently displayed on the screen in the source image 41 (step E13), and acquires the coordinates of the right side and the left side of the display destination region (rectangular region) from the x-coordinate of the designated portion 21 (step E14).

Figure 18:
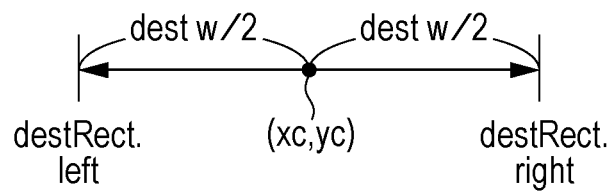
FIG. 18 is a diagram for explaining a display destination region that is set through the display destination region setting process according to the first embodiment.

An example of such a situation is shown in FIG. 18.

Here, the coordinates of the designated portion 21 in the source image 41 are (xc, yc), and the width of the display destination region 23 is represented by destw. The positions that are horizontally shifted from the x-coordinate of the designated portion 21 by destw/2 on both sides are obtained as the coordinates (destRect.right, destRect.left) of the right side and the left side of the display destination region 23 (the rectangular region).

After obtaining the coordinates of the right side and the left side of the display destination region 23 (the rectangular region), the CPU 11 sets the coordinate of the bottom side of the display destination region 23 by taking a predetermined margin into account on the assumption that the display destination region 23 will be displayed above the designated portion 21 (step E15), and sets the coordinate of the top side based on the coordinate of the bottom side (step E16).

Figure 19:
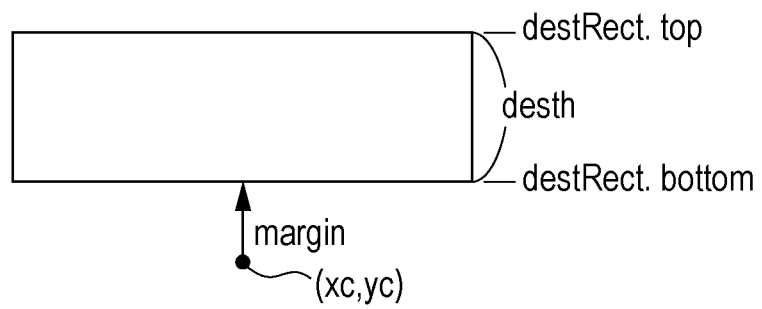
FIG. 19 is a diagram for explaining a process to set the display destination region above a designated portion according to the first embodiment.

An example of such a situation is shown in FIG. 19.

Where the height of the display destination region 23 is represented by desth, the position that is moved upward from the coordinates (xc, yc) of the designated portion 21 by a predetermined margin is the coordinate (destRect.bottom) of the bottom side of the display destination region 23. Further, the position that is moved upward from the bottom-side coordinate (destRect.bottom) by the height desth is the top-side coordinate (destRect.top) of the display destination region 23. In practice, the predetermined margin can be a value determined by taking into account the size of the enlarged source region 22.

The CPU 11 then determines whether the display destination region 23 is within the region of the currently displayed music score image. If the display destination region 23 is within the music score image region, the display destination region 23 is fixed in the position of the current coordinates.

If the display destination region 23 is not within the music score image region, the CPU 11 corrects the coordinates of the position of the display destination region 23 so that the display destination region 23 falls within the music score image region. Specifically, if the display destination region 23 sticks out of the left side of the music score image region (Yes in step E18), for example, the CPU 11 moves the display destination region 23 to the right by the amount equivalent to the sticking-out portion (step E19).

If the display destination region 23 sticks out of the top side of the music score image region (Yes in step E20), the CPU 11 redefines the coordinates of the top side and the bottom side of the display destination region 23 so that the display destination region 23 is displayed below the designated portion (steps E21 and E22).

Figure 20:
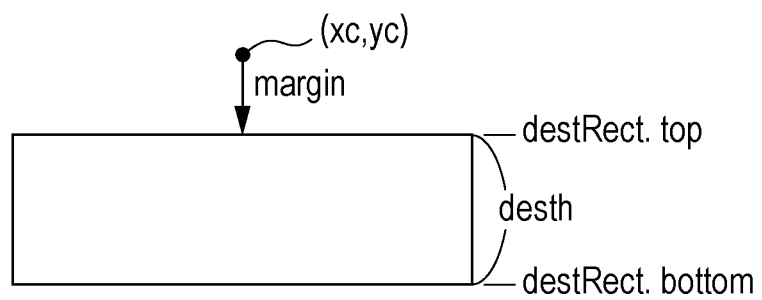
FIG. 20 is a diagram for explaining a process to set the display destination region below the designated portion according to the first embodiment.

An example of such a situation is shown in FIG. 20.

In a case where the display destination region 23 sticks out of the top side of the music score image region, the position moved downward from the coordinates (xc, yc) of the designated portion 21 by the predetermined margin is set as the top-side coordinate (destRect.top) of the display destination region 23. Further, the position that is moved downward from the top-side coordinate (destRect.top by the height desth is set as the bottom-side coordinate (destRect.bottom) of the display destination region 23.

In this flowchart, after the display destination region 23 is moved downward, no check is made to determine whether the display destination region 23 sticks out of the bottom side. As described above, a coordinate calculation is first performed so as to display an enlarged image in the upper portion, and the displayed image is moved downward only if the displayed image sticks out of the top side. Therefore, if the displayed image sticks out of the bottom side, it will remain sticking out of either side whether it is moved upward or downward. In view of this, the portion that can be displayed is displayed on one side (remaining on the lower side, for example) in the above described situation.

If the display destination region 23 sticks out of the right side of the music score image region (Yes in step E23), the CPU 11 moves the display destination region 23 to the left by the amount equivalent to the sticking-out portion (step E24).

After the source region 22 and the display destination region 23 are set in this manner, the portion of the music score image 20 in the source region 22 is extracted, and is enlarged and displayed in the region corresponding to the display destination region 23 on the display screen 42, as described above with reference to steps C16 through C18 shown in FIG. 12. At this point, the region corresponding to the source region 22 on the display screen 42 is filled with a predetermined color.

As described above, according to the first embodiment, when the user designates a desired portion by a touch operation while a music score is displayed on the screen, a first region (the source region 22) indicating the range of enlarged display in the music score and a second region (the display destination region 23) as the enlarged display destination are set based on the designated portion, and the portion of the music score in the first region is enlarged and displayed in the second region.

Accordingly, the entire music score can remain displayed for visibility. When the user wishes to examine a detail in the music score, he/she performs a touch operation to partially enlarge and display the portion designated through the touch operation on the screen, and examine the designated portion.

Since the region enlarged and displayed is filled with a predetermined color, it is possible to visually recognize which portion of the music score is enlarged and displayed.

(Second Embodiment)

Next, a second embodiment is described.

In the above described first embodiment, the size of the source region 22 indicating the region to be enlarged and displayed is fixed. In the second embodiment, on the other hand, the size of the source region 22 is determined by taking into account the measures and the parts in the music score.

Specific examples are now described.

Figure 21:
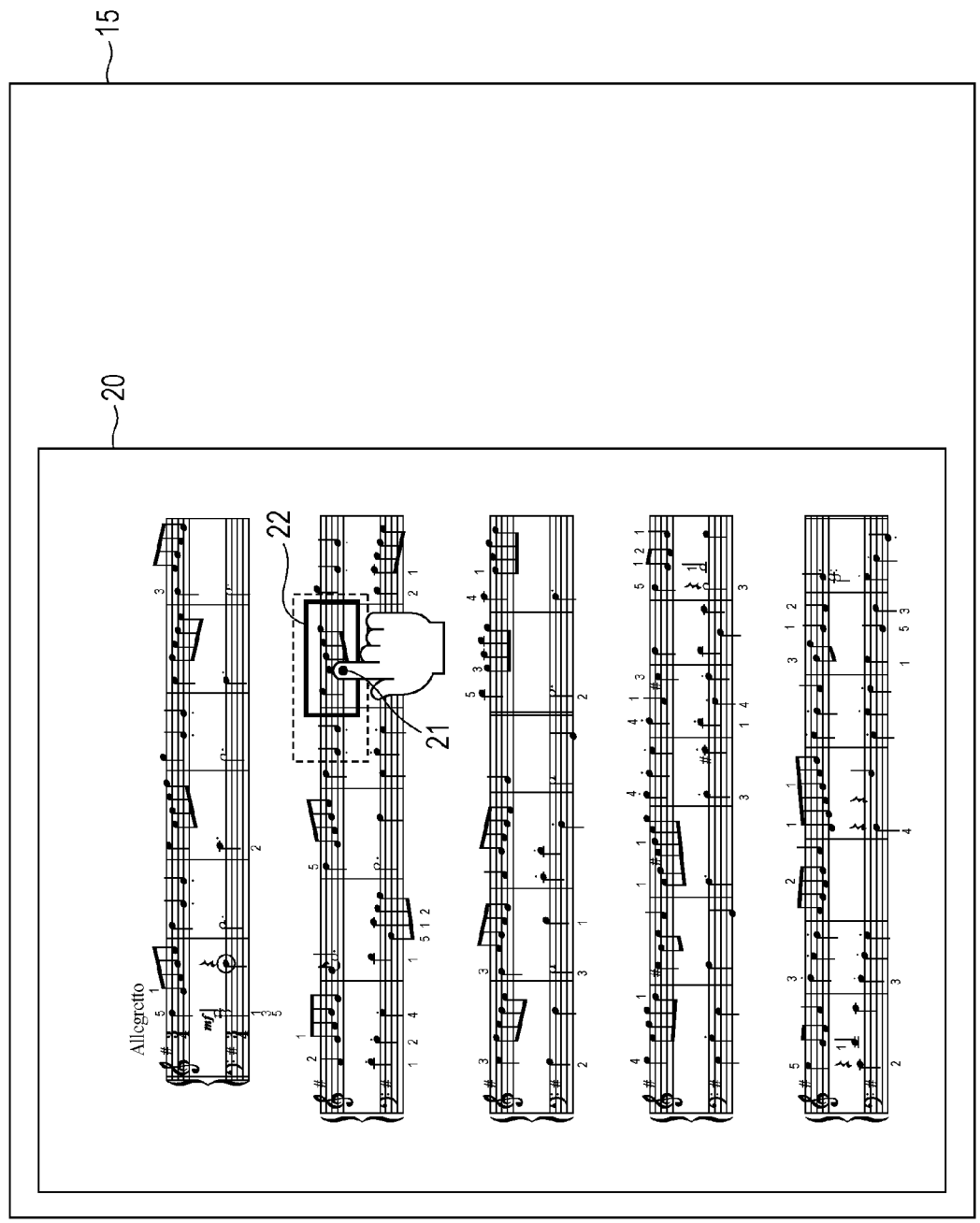
FIG. 21 is a diagram showing an enlarged display source region that is set in a currently displayed music score image according to a second embodiment of the present invention.
Figure 22:
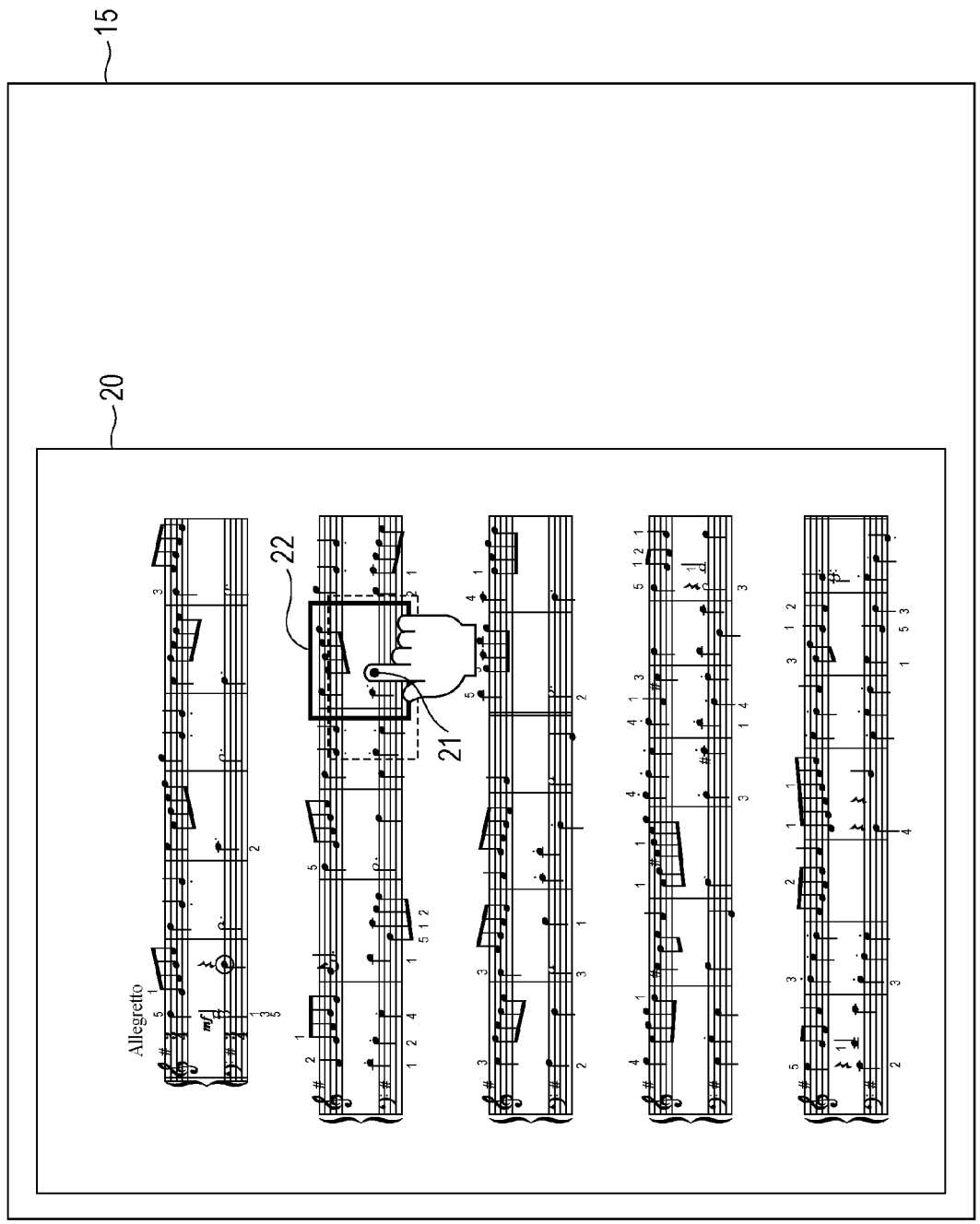
FIG. 22 is a diagram showing an enlarged display source region that is set in a currently displayed music score image according to the second embodiment.

FIGS. 21 and 22 are diagrams showing enlarged display source regions that are set on a music score image display screen. In each of the drawings, the rectangular region indicated by a dashed line is an example of the source region 22 of the first embodiment.

As in the above described first embodiment, when the user touches and designates a desired portion 21 of the music score image 20 on the screen with a finger, a rectangular source region 22 is set based on the designated portion 21.

In the second embodiment, the region of the measure to which the designated portion 21 belongs is set as the source region 22. At this point, the range of the source region 22 varies with the location of the designated portion 21 in each part in the music score. Specifically, as shown in the example illustrated in FIG. 21, when the user touches the upper stave of the music score, a source region 22 to display the corresponding measure of the upper stave is set.

When the user touches the lower stave of the music score, a source region 22 to display the corresponding measure of the lower stave is set. Further, as shown in FIG. 22, when the user touches a portion between the upper stave and the lower stave, a source region 22 to display the corresponding measures of both the upper stave and the lower stave is set.

Operation of a music score display device 10 according to the second embodiment is now described in detail.

As for (a) the main process and (b) the score image display process, the same processes as those of the first embodiment are performed (see FIGS. 9 and 10). Therefore, (c) the partially enlarged display process is now described. The processes shown in the respective flowcharts described below are performed by the CPU 11 of the music score display device 10 reading the programs 13a stored in the ROM 13.

(c) Partially Enlarged Display Process

Figure 23:
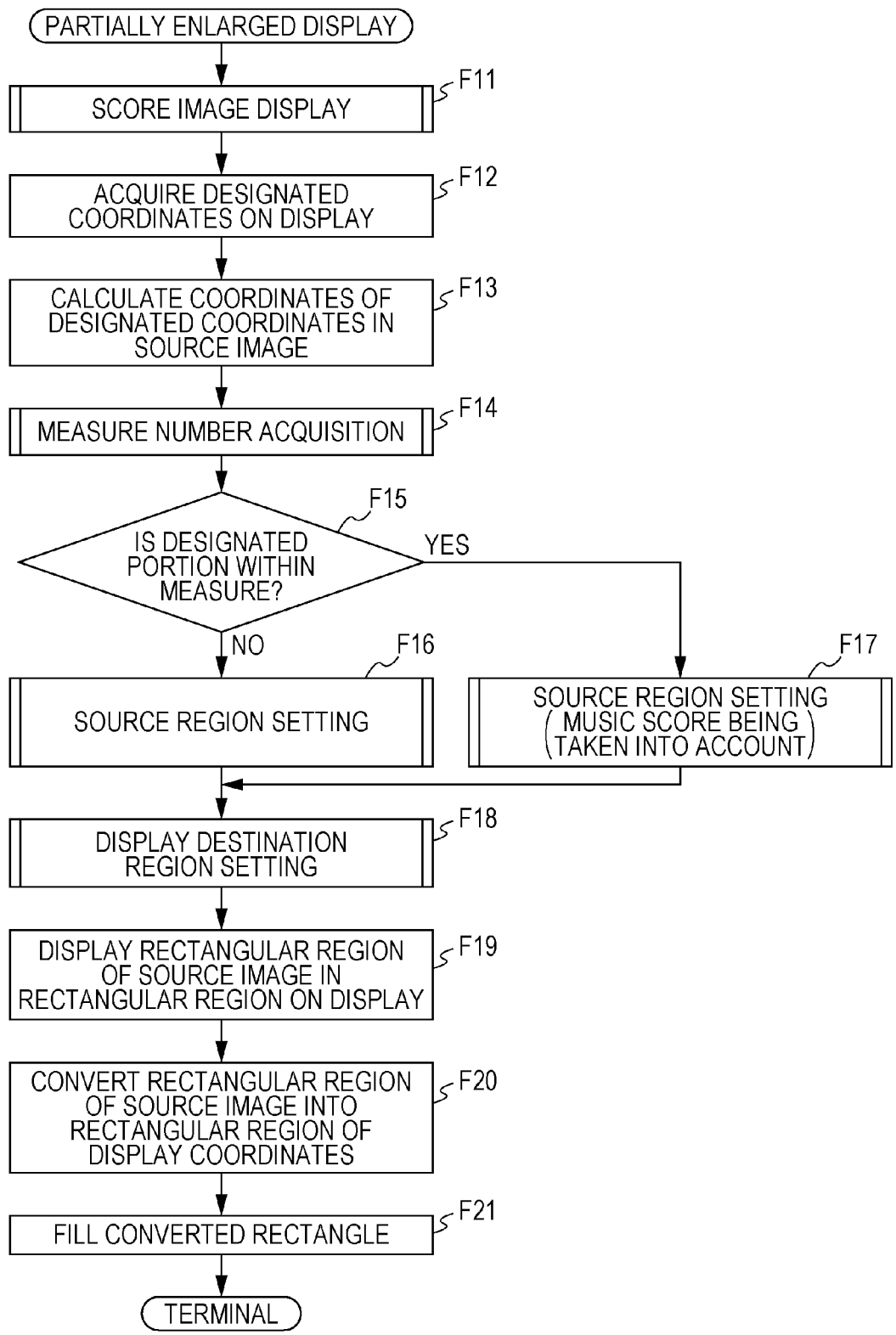
FIG. 23 is a flowchart showing the partially enlarged display process to be performed in step A16 shown in FIG. 9 according to the second embodiment.

FIG. 23 is a flowchart showing the partially enlarged display process to be performed in step A16 shown in FIG. 9, instead of the process shown in FIG. 12, according to the second embodiment.

While a desired music score image 20 is displayed on the screen of the display unit 15 through the above described score image display process shown in FIG. 10 (step F11), the CPU 11 performs the process described below.

Specifically, the CPU 11 acquires the designated coordinates of a portion 21 designated by the user on a display screen 42 (the screen of the display unit 15) based on touch-panel input positional coordinates information (step F12), and converts the designated coordinates into coordinates in a source image 41 (step F13) More specifically, the CPU 11 calculates the coordinates corresponding to the designated coordinates on the display screen 42 in the source image 41 based on the correlation between the source image 41 and the display screen 42 shown in FIG. 11.

The CPU 11 then acquires the measure number of the portion 21 designated by the user (the designated coordinates) in the coordinate system of the source image 41 (step F14). The measure number acquisition process will be described later in detail, with reference to FIG. 24.

Here, the process is divided depending on whether the portion 21 designated by the user is within a measure in the music score.

If the designated portion 21 is outside the measures in the music score (or is located in blank space, for example) (No in step F15), the CPU 11 sets a source region 22 by performing a regular source region setting process (see FIG. 13) (step F16). If the designated portion 21 is within a measure in the music score (Yes in step F15), the CPU 11 sets a source region 22 by performing a source region setting process that takes the music score into account (step F17). This source region setting process will be described later, with reference to FIGS. 26 and 27.

After setting the source region 22 through the source region setting process in step F16 or F17, the CPU 11 performs a display destination region setting process to set a display destination region 23 for the source region 22 (step F18). This display destination region setting process is the same as that of the first embodiment, and has already been described with reference to FIGS. 16 and 17. Therefore, detailed explanation of the display destination region setting process will not be repeated herein.

After setting the source region 22 and the display destination region 23, the CPU 11 extracts the source region 22 of the music score image 20 from the source image 41, and enlarges and displays the source region 22 in the region corresponding to the display destination region 23 on the display screen 42 (step F19).

The CPU 11 then converts the rectangular region of the source region 22 in the source image 41 into coordinates on the display screen 42 (step F20), and fills the region corresponding to the source region 22 with a predetermined color, to distinguish the region from the other regions (step F21).

The measure number acquisition process and the source region setting process (with the music score being into account), which are characteristic of the second embodiment, will be described below in detail.

(Measure Number Acquisition Process)

Figure 24:
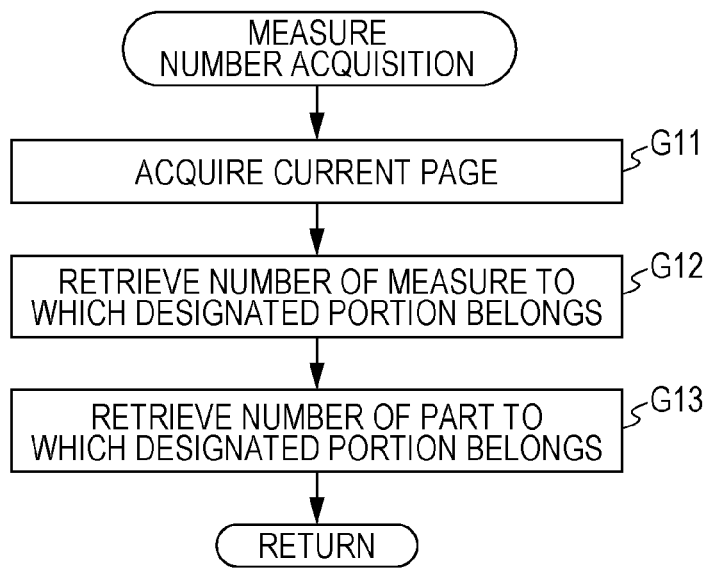
FIG. 24 is a flowchart showing the measure number acquisition process to be performed in step F14 shown in FIG. 23 according to the second embodiment.

FIG. 24 is a flowchart showing the measure number acquisition process to be performed in step F14 shown in FIG. 23.

First, the CPU 11 acquires the page currently displayed on the screen in the music score image 20 (step G11). The CPU 11 then sequentially searches the measures in the page of the music score from the top, and retrieves the number of the measure to which the designated portion (designated coordinates) belongs (step G12). If the music score is formed with more than one stave, the measure to which the designated portion belongs is determined by searching the respective measures each including the respective staves.

The definition of the measure to which a designated portion (designated coordinates) belongs is now described.

Figure 25A:
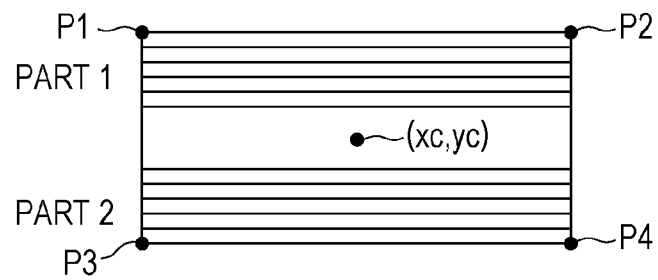
FIGS. 25A and 25B are diagrams for explaining the measure to which a designated portion belongs in the second embodiment.
Figure 25B:
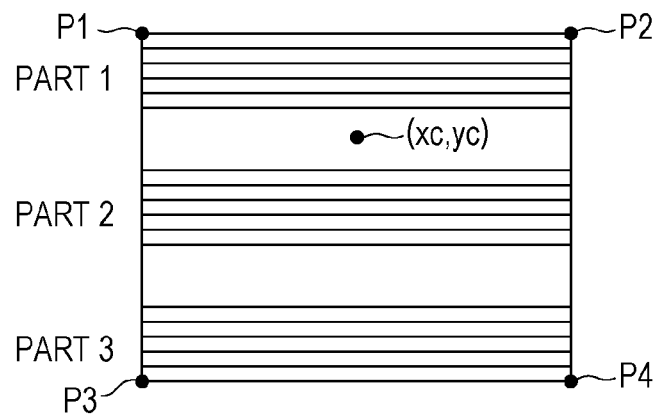

FIG. 25A is a diagram showing an example of a music score of a piece involving two parts. FIG. 25B is a diagram showing an example of a music score of a piece involving three parts.

As shown in FIG. 25A, in a music score of a piece involving two parts, the measure to which a designated portion belongs is the region surrounded by the four points; the upper left point P1 and the upper right point P2 on the measure boundary of the upper stave for part 1, and the lower left point P3 and the lower right point P4 on the measure boundary of the lower stave for part 2.

As shown in FIG. 25B, in a music score involving the three parts of part 1, 2, and 3, the measure to which a designated portion belongs is the region surrounded by the four points; the upper left point P1 and the upper right point P2 on the measure boundary of the uppermost stave for part 1, and the lower left point P3 and the lower right point P4 on the measure boundary of the lowermost stave for part 3.

After acquiring the corresponding measure number, the CPU 11 acquires the number of the part to which the designated portion belongs (step G13). In this case, the part number is determined based on where the y-coordinate of the designated portion is located in the measure.

Specifically, in the example shown in FIG. 25A, if the y-coordinate of the designated portion is located in the region of the part 1 in the measure, "1" is set as the part number. If the y-coordinate of the designated portion is located in the region of the part 2 in the measure, "2" is set as the part number. If the y-coordinate of the designated portion is located between the part 1 and the part 2, the regions of both the part 1 and the part 2 in the measure are to be displayed. In this case, "0" is set as the part number. If the y-coordinate of the designated portion is not located in either the regions of the part 1 and the part 2, the designated portion is processed as a portion not to be displayed. In a case where "the y-coordinate of the designated portion is located in the region of the part 1 in the measure", the y-coordinate of the designated portion is located between the fifth line (the uppermost line) and the first line (the lowermost line) of the stave for the part 1, for example.

In the example shown in FIG. 25B, if the y-coordinate of the designated portion is located between the part 1 and the part 2, or is located between the part 2 and the part 3, the regions of all the parts in the measure are to be displayed, and "0" is set as the part number.

(Source Region Setting Process)

Figure 26:
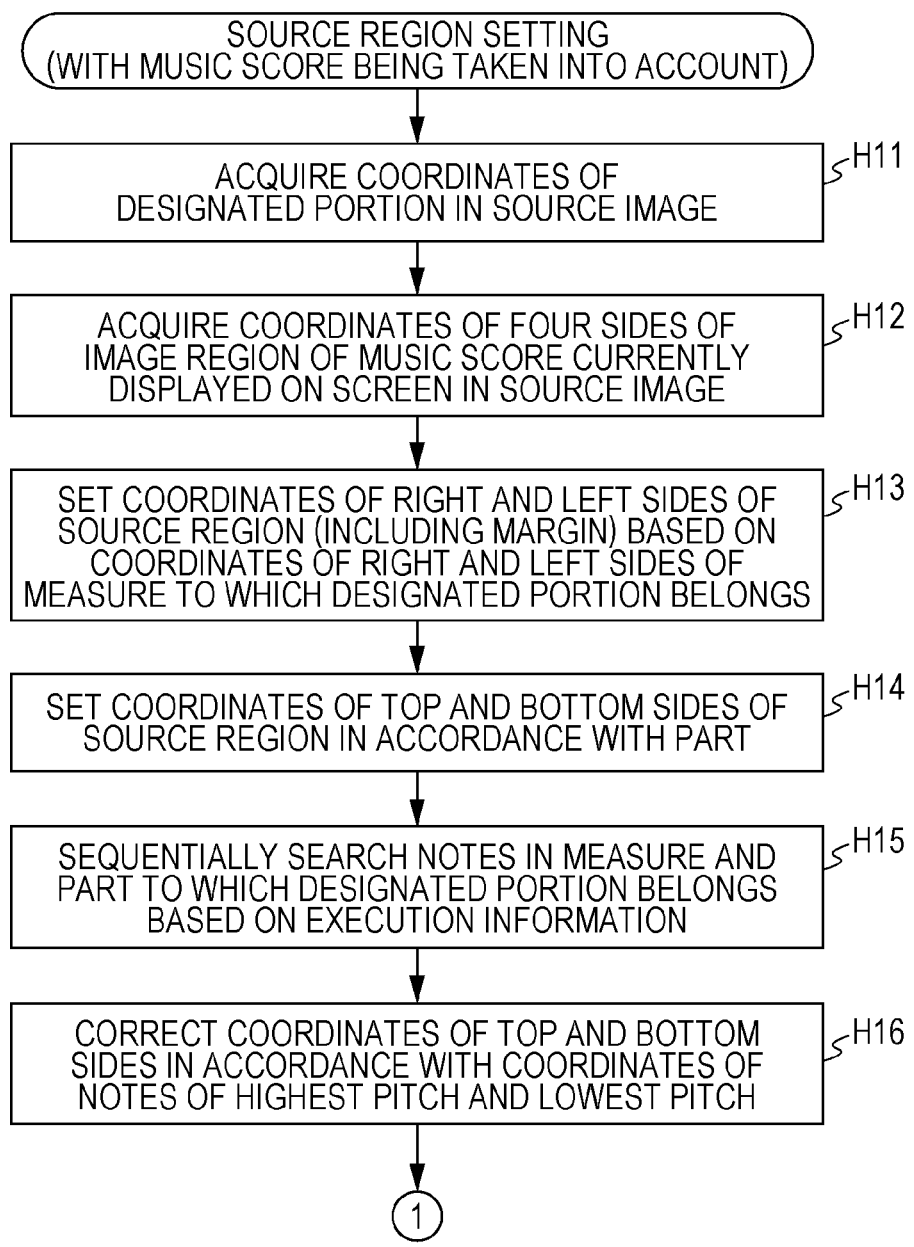
FIG. 26 is a flowchart showing the source region setting process (with the music score being taken into account) to be performed in step F17 shown in FIG. 23 according to the second embodiment.
Figure 27:
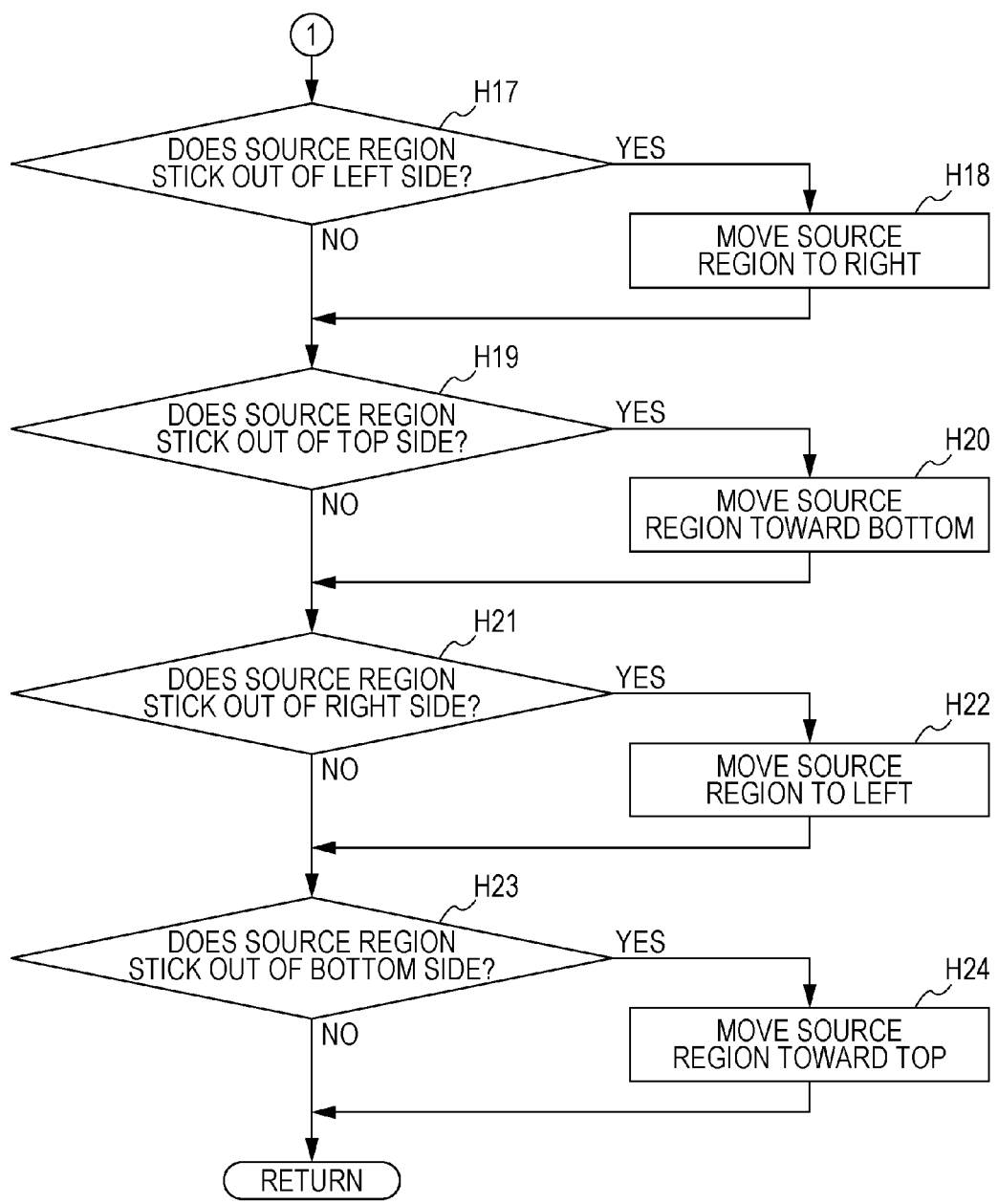
FIG. 27 is the continued flowchart showing the source region setting process (with the music score being taken into account) to be performed in step F17 shown in FIG. 23 according to the second embodiment.

FIGS. 26 and 27 are a flowchart showing the source region setting process (with the music score being taken into account) to be performed in step F17 shown in FIG. 23.

First, the CPU 11 acquires the coordinates of the portion 21 (the x-y coordinates of the designated point), which has been designated by the user on the display screen 42 (the screen of the display unit 15), in the source image 41 (step H11). The CPU 11 also acquires the coordinates (the x-coordinates of the right and left sides, and the y-coordinates of the top and bottom sides) of the four sides (the right side, the left side, the top side, and the bottom side) corresponding to the image region of the music score currently displayed on the screen in the source image 41 (step H12).

The CPU 11 then sets the coordinates of the source region 22 in the source image 41 based on the measure number and the part number acquired in the measure number acquisition process shown in FIG. 24. Specifically, the CPU 11 first checks the coordinates of the right and left sides of the corresponding measure in the source image 41 based on the measure number, and sets the coordinates of the right and left sides of the source region 22 (a rectangular region) to be enlarged and displayed based on the coordinates of the right and left sides of the corresponding measure (the coordinates of the right and left sides of the measure to which the portion designated by the user belongs), with a predetermined margin being taken into account (step H13).

Figure 28:
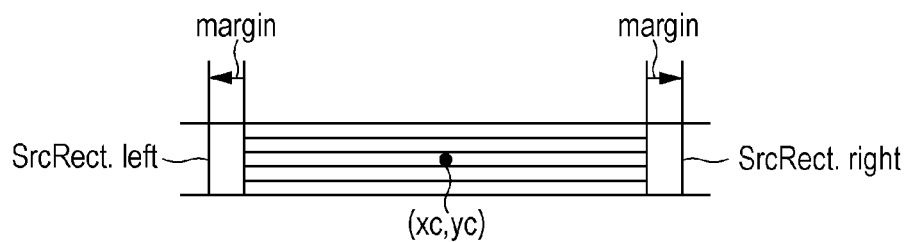
FIG. 28 is a diagram for explaining a source region that is set through the source region setting process (with the music score being taken into account) according to the second embodiment.

An example of such a situation is shown in FIG. 28.

Where the measure to which the coordinates (xc, yc) of the designated portion 21 is acquired, the coordinates of the position obtained by adding the predetermined margin to the coordinates of the right and left sides of the measure is determined to be the coordinates (SrcRect.right, SrcRect.left) of the right and left sides of the source region 22. In this case, the source region 22 to be enlarged with respect to the position of the designated portion 21 does not necessarily have a width that is symmetrical about the designated portion 21, and the source region 22 is defined based on the region of the measure that includes the designated portion 21.

The CPU 11 then sets the coordinates of the top and bottom sides of the source region 22 (a rectangular region) in accordance with the corresponding part in the source image 41 based on the part number (step H14).

Figure 29:
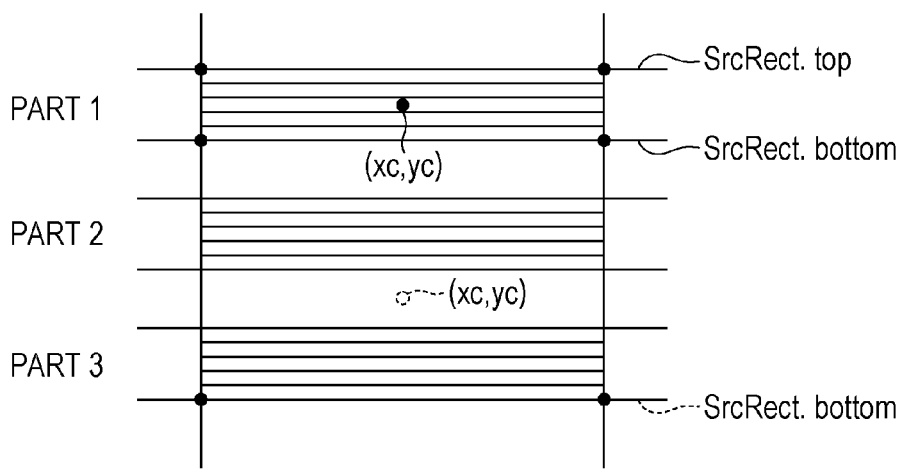
FIG. 29 is a diagram for explaining a source region that is set through the source region setting process (with the music score being taken into account) and takes respective parts into account according to the second embodiment.

An example of such a situation is shown in FIG. 29.

If the part number of the measure to which the coordinates (xc, yc) of the designated portion 21 belong is "1", the coordinates of the top and bottom sides of the uppermost stave for the part 1 in the measure are determined to be the coordinates (SrcRect.top, SrcRect.bottom) of the top and bottom sides of the source region 22.

Likewise, if the part number is "2", the coordinates of the top and bottom sides of the middle stave for the part 2 in the measure are determined to be the coordinates of the top and bottom sides of the source region 22. If the part number is "3", the coordinates of the top and bottom sides of the lowermost stave for the part 3 in the measure are determined to be the coordinates of the top and bottom sides of the source region 22. If the part number is "0", all the parts in the measure are to be displayed. Therefore, the coordinate of the top side of the part 1 is determined to be the coordinate of the top side of the source region 22, and the coordinate of the bottom side of the part 3 is determined to be the coordinate of the bottom side of the source region 22. At this stage, a margin may be set for each of the coordinates of the top and bottom sides of the source region 22, as in the setting of the coordinates of the right and left sides.

After the coordinates of the four sides (the right side, the left side, the top side, and the bottom side) of the rectangular region forming the source region 22 in the source image 41 are set in the above manner, the CPU 11 adjusts the position of the source region 22 in accordance with the positions of notes or the screen size.

Specifically, the CPU 11 first sequentially searches the respective notes for the part in the measure to be displayed based on the execution information shown in FIG. 6, and acquires the coordinates of the note of the highest pitch and the note of the lowest pitch therein (step H15). The CPU 11 then appropriately corrects the coordinates of the highest and lowest notes so that the highest and lowest notes will fall within the source region 22 based on the coordinates of these notes (step H16).

Figure 30:
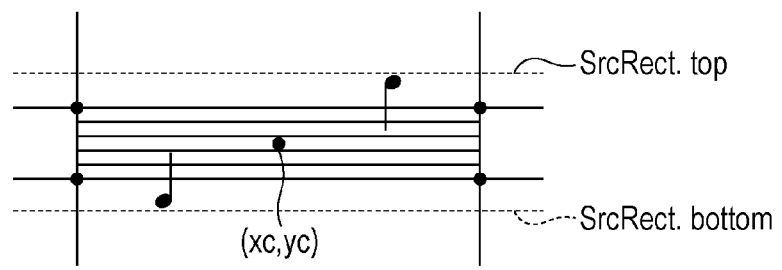
FIG. 30 is a diagram for explaining a source region that is set through the source region setting process (with the music score being taken into account) and takes into account the positions of the respective notes in the measure according to the second embodiment.

An example of such a situation is shown in FIG. 30.

If the head of the note of the lowest pitch among the notes included in the measure to be displayed is below the first line, which is the lowermost line in the stave, the coordinate (SrcRect.bottom) of the bottom side of the source region 22 is corrected in accordance with the position of the head of the note. If the head of the note of the highest pitch is located above the fifth line, which is the uppermost line in the stave, the coordinate (SrcRect.top) of the top side of the source region 22 is corrected in accordance with the position of the head of the note.

The CPU 11 then determines whether the source region 22 is within the region of the currently displayed music score image. If the source region 22 is within the music score image region, the source region 22 is fixed in the position of the current coordinates.

If the source region 22 is not within the music score image region, the CPU 11 corrects the coordinates of the position of the source region 22 so that the source region 22 falls within the music score image region. Specifically, if the source region 22 sticks out of the left side of the music score image region (Yes in step H17), for example, the CPU 11 moves the source region 22 to the right by the amount equivalent to the sticking-out portion, as described above with reference to FIG. 15 (step H18).

Likewise, if the source region 22 sticks out of the top side of the music score image region, the CPU 11 moves the source region 22 toward the bottom (steps H19 and H20). If the source region 22 sticks out of the right side of the music score image region, the CPU 11 moves the source region 22 to the left (steps H21 and H22). If the source region 22 sticks out of the bottom side of the music score image region, the CPU 11 moves the source region 22 toward the top (steps H23 and H24). In this manner, the coordinates of the source region 22 are corrected so as to fall within the music score image region.

After the source region 22 is set in this manner, the display destination region 23 for the source region 22 is set, and the portion of the music score image 20 in the source region 22 is extracted, and is enlarged and displayed in the region corresponding to the display destination region 23 on the display screen 42, as described above with reference to steps F18 through F21 shown in FIG. 23. At this point, the region corresponding to the source region 22 on the display screen 42 is filled with a predetermined color.

As described above, according to the second embodiment, the measure to which a portion designated by a user belongs is set as the region (the source region 22) to be enlarged and displayed. When the region is enlarged and displayed, details can be examined on a measure-by-measure basis. Furthermore, in the second embodiment, the region (the source region 22) to be enlarged and displayed is set based on the region of the measure to which the portion designated by the user. Accordingly, the measure to which the user is paying attention can be appropriately enlarged and displayed, and enlarged display of a region that is musically meaningless (enlarged display based on a musically meaningless division, such as enlarged display of only half a measure or enlarged display of only the lines higher than the third line of a stave) can be prevented. Thus, user-friendly enlarged display can be realized.

In a case where the measure is formed with more than one part, the region to be enlarged and displayed (the source region 22) is set in accordance with the positional relationship between the designated portion and each part. Specifically, if the designated portion is located in the stave for one of the parts, the stave for the one part is the object to be enlarged and displayed. If the designated portion is located between the staves for the respective parts, the staves for all the parts are the objects to be enlarged and displayed. Accordingly, the stave for any desired part can be enlarged and displayed, and details therein can be examined. This is useful when a piece involving a large number of parts is rehearsed.

(Third Embodiment)

Next, a third embodiment is described.

Although the display destination region 23 corresponding to a source region 22 is set in a desired position in the first embodiment, a display destination region 23 is set by taking into account the music score at a designated portion in the third embodiment.

Specific examples are now described.

Figure 31:
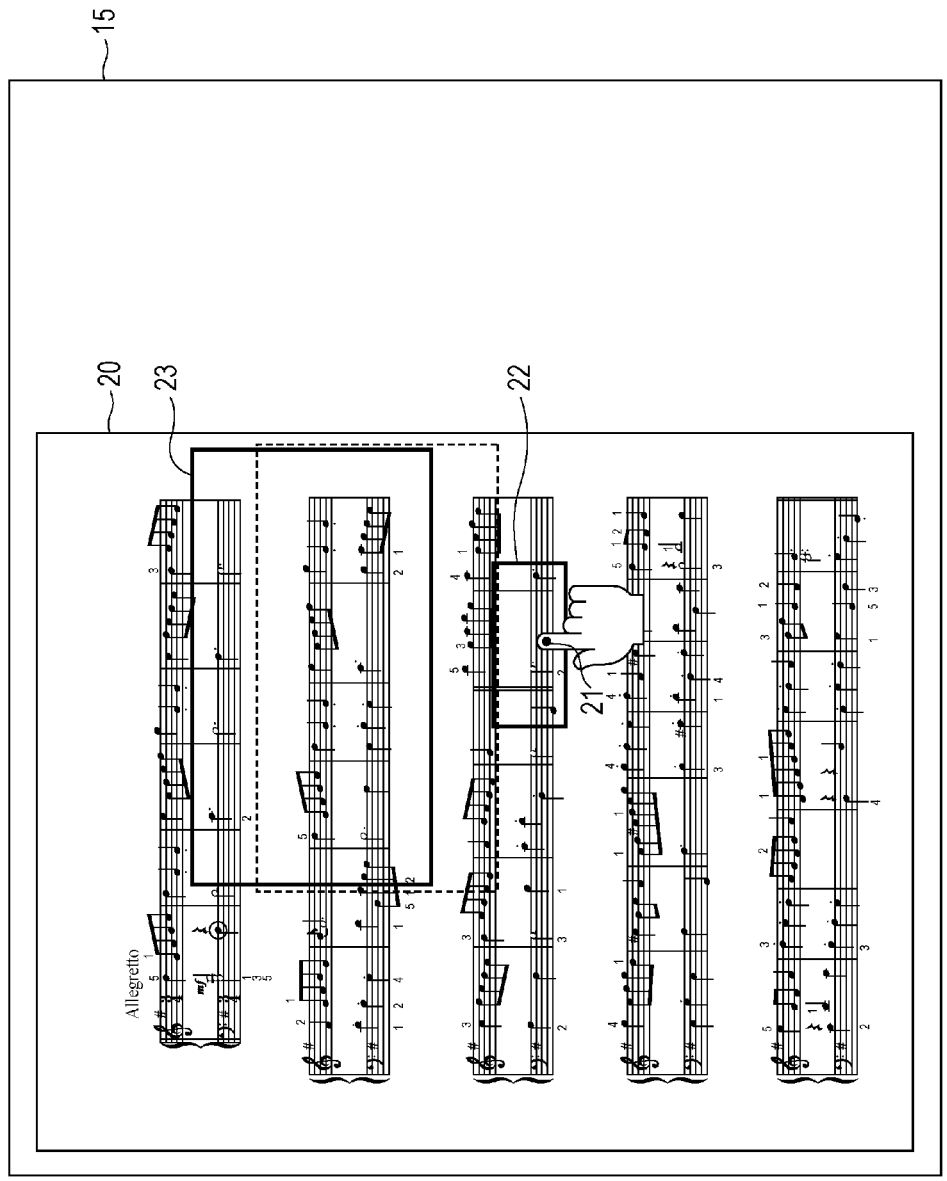
FIG. 31 is a diagram showing a display destination region set in a currently displayed music score image according to a third embodiment of the present invention.
Figure 32:
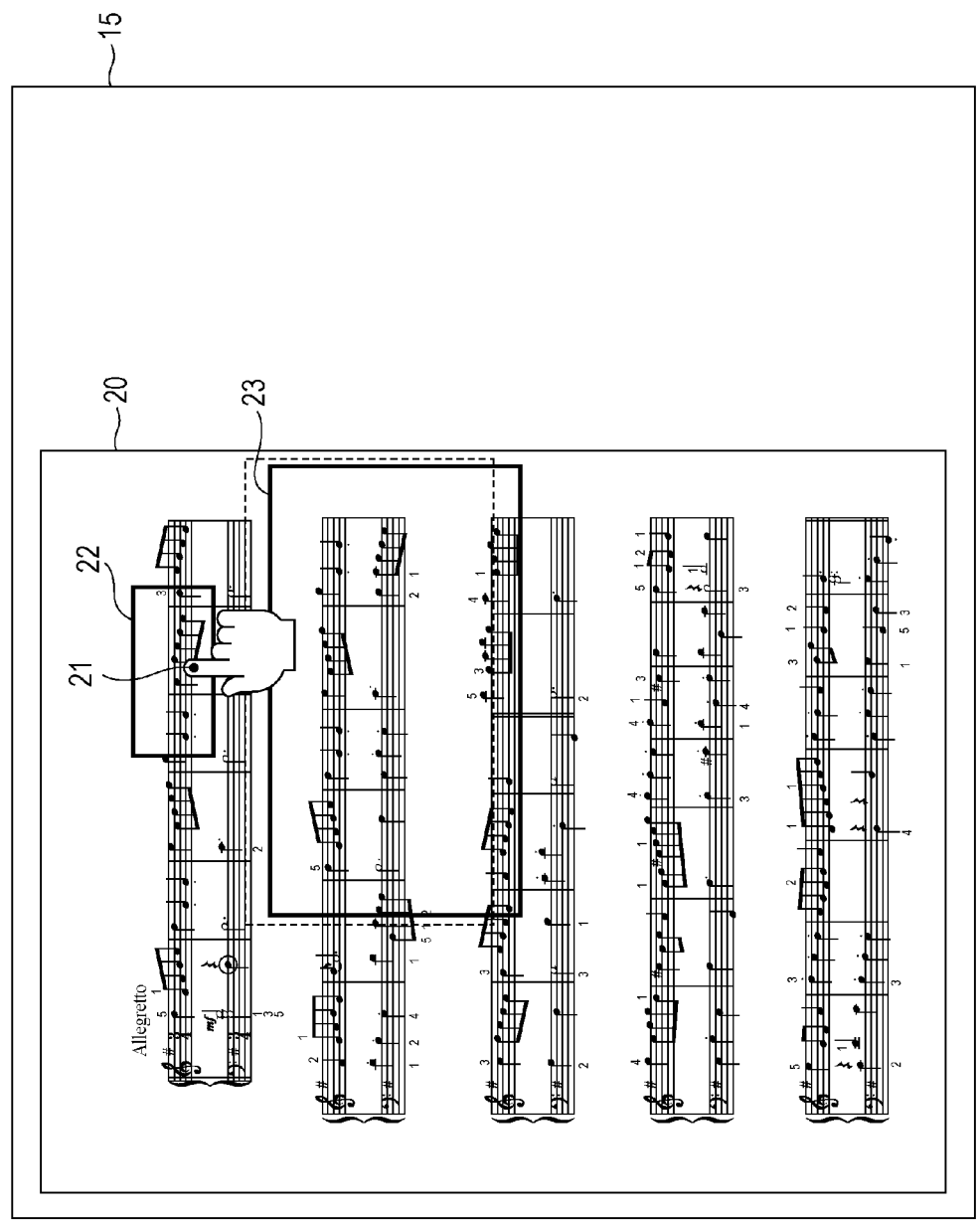
FIG. 32 is a diagram showing a display destination region set in a currently displayed music score image according to the third embodiment.

FIGS. 31 and 32 are diagrams each showing a display destination region that is set in the currently displayed music score image.

In each of the drawings, the rectangular region indicated by a dashed line is a display destination region 23 of the first embodiment.

As in the above described first embodiment, when the user touches and designates a desired portion 21 of the music score image 20 on the screen with a finger, a rectangular source region 22 is set based on the designated portion 21. A rectangular display destination region 23 is also set based on the designated portion 21, and the portion of the music score in the source region 22 is enlarged and displayed in the display destination region 23.

In the third embodiment, the position of the display destination region 23 is set so as not to hide the music score in the vicinity of the designated portion 21. Specifically, in the example shown in FIG. 31, if the display destination region 23 is set immediately above the designated portion 21, the upper stave in the measure including the designated portion 21 is hidden by the display destination region 23. Therefore, the display destination region 23 is set in an even higher position, and the portion of the music score in the source region 22 is enlarged and displayed in the display destination region 23.

In the example shown in FIG. 32, if the display destination region 23 is set immediately below the designated portion 21, the lower stave in the measure including the designated portion 21 is hidden by the display destination region 23. Therefore, the display destination region 23 is set in an even lower position, and the portion of the music score in the source region 22 is enlarged and displayed in the display destination region 23.

Operation of a music score display device 10 according to the third embodiment is now described in detail.

As for (a) the main process and (b) the score image display process, the same processes as those of the first embodiment are performed (see FIGS. 9 and 10). Therefore, (c) the partially enlarged display process is now described. The processes shown in the respective flowcharts described below are performed by the CPU 11 of the music score display device 10 reading the programs 13a stored in the ROM 13.

(c) Partially Enlarged Display Process

Figure 33:
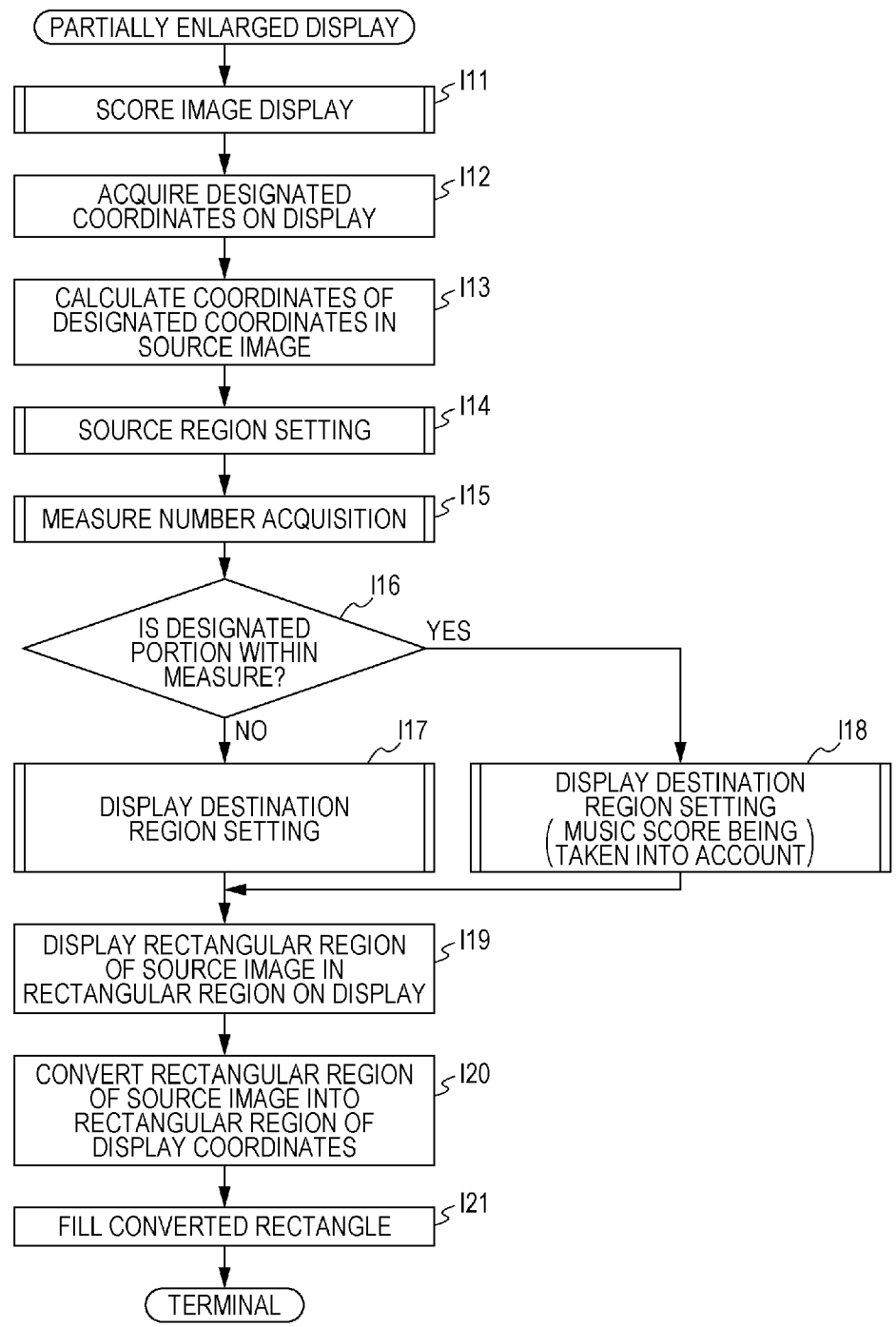
FIG. 33 is a flowchart showing the partially enlarged display process to be performed in step A16 shown in FIG. 9 according to the third embodiment.

FIG. 33 is a flowchart showing the partially enlarged display process to be performed in step A16 shown in FIG. 9, instead of the process shown in FIG. 12, according to the third embodiment.

While a desired music score image 20 is displayed on the screen of the display unit 15 through the above described score image display process shown in FIG. 10 (step I11), the CPU 11 performs the process described below.

Specifically, the CPU 11 acquires the designated coordinates of a portion 21 designated by the user on a display screen 42 (the screen of the display unit 15) based on touch-panel input positional coordinates information (step I12), and converts the designated coordinates into coordinates in a source image 41 (step I13) More specifically, the CPU 11 calculates the coordinates corresponding to the designated coordinates on the display screen 42 in the source image 41 based on the correlation between the source image 41 and the display screen 42 shown in FIG. 11.

In the coordinate system of the source image 41, the CPU 11 then performs a source region setting process for setting the source region 22 to be enlarged and displayed based on the portion 21 designated by the user (the designated coordinates) (step I14). This source region setting process is the same as step C14 of the first embodiment, and has already been described with reference to FIG. 13. Therefore, detailed explanation of the source region setting process will not be repeated herein.

The CPU 11 also acquires the measure number of the portion 21 designated by the user (the designated coordinates) (step I15). This measure number acquisition process is the same as step F14 of the second embodiment, and has already been described with reference to FIG. 24. Therefore, detailed explanation of the measure number acquisition process will not be repeated herein.

Here, the process is divided depending on whether the portion 21 designated by the user is within a measure in the music score. If the designated portion 21 is outside the measures in the music score (or is located in blank space, for example) (No in step I16), the CPU 11 sets a display destination region 23 by performing a regular display destination region setting process (see FIGS. 16 and 17) (step I17). If the designated portion 21 is within a measure in the music score (Yes in step I16), the CPU 11 performs a display destination region setting process that takes the music score into account (step I18). This display destination region setting process will be described later, with reference to FIGS. 34 and 35.

After setting the source region 22 and the display destination region 23, the CPU 11 extracts the source region 22 of the music score image 20 from the source image 41, and enlarges and displays the source region 22 in the region corresponding to the display destination region 23 on the display screen 42 (step I19).

The CPU 11 then converts the rectangular region of the source region 22 in the source image 41 into coordinates on the display screen 42 (step I20), and fills the region corresponding to the source region 22 with a predetermined color, to distinguish the region from the other regions (step I21).

The display destination region setting process (with the music score being into account), which is characteristic of the third embodiment, will be described below in detail.

(Display Destination Region Setting Process)

Figure 34:
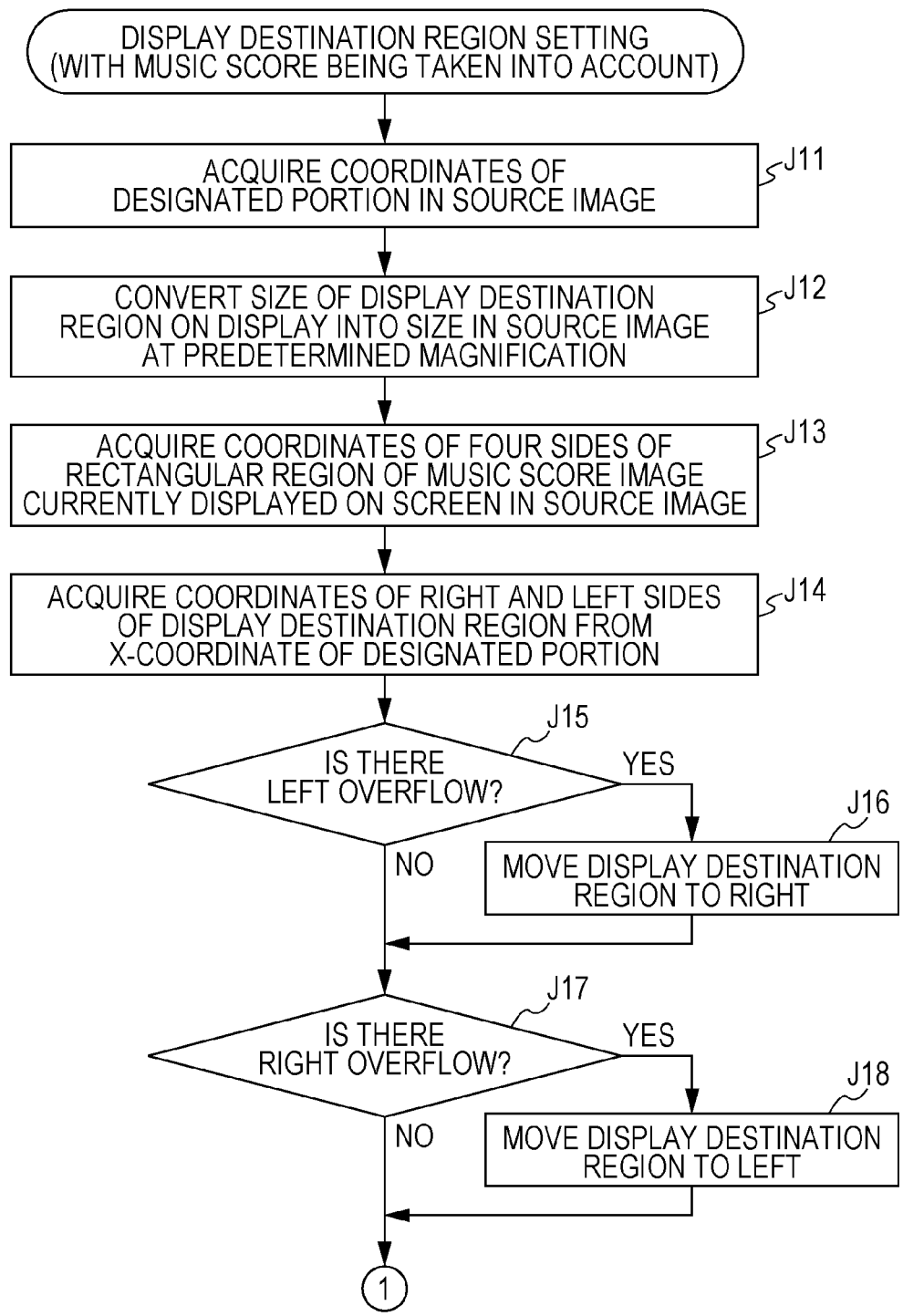
FIG. 34 is a flowchart showing the display destination region setting process (with the music score being taken into account) to be performed in step I18 shown in FIG. 33 according to the third embodiment.
Figure 35:
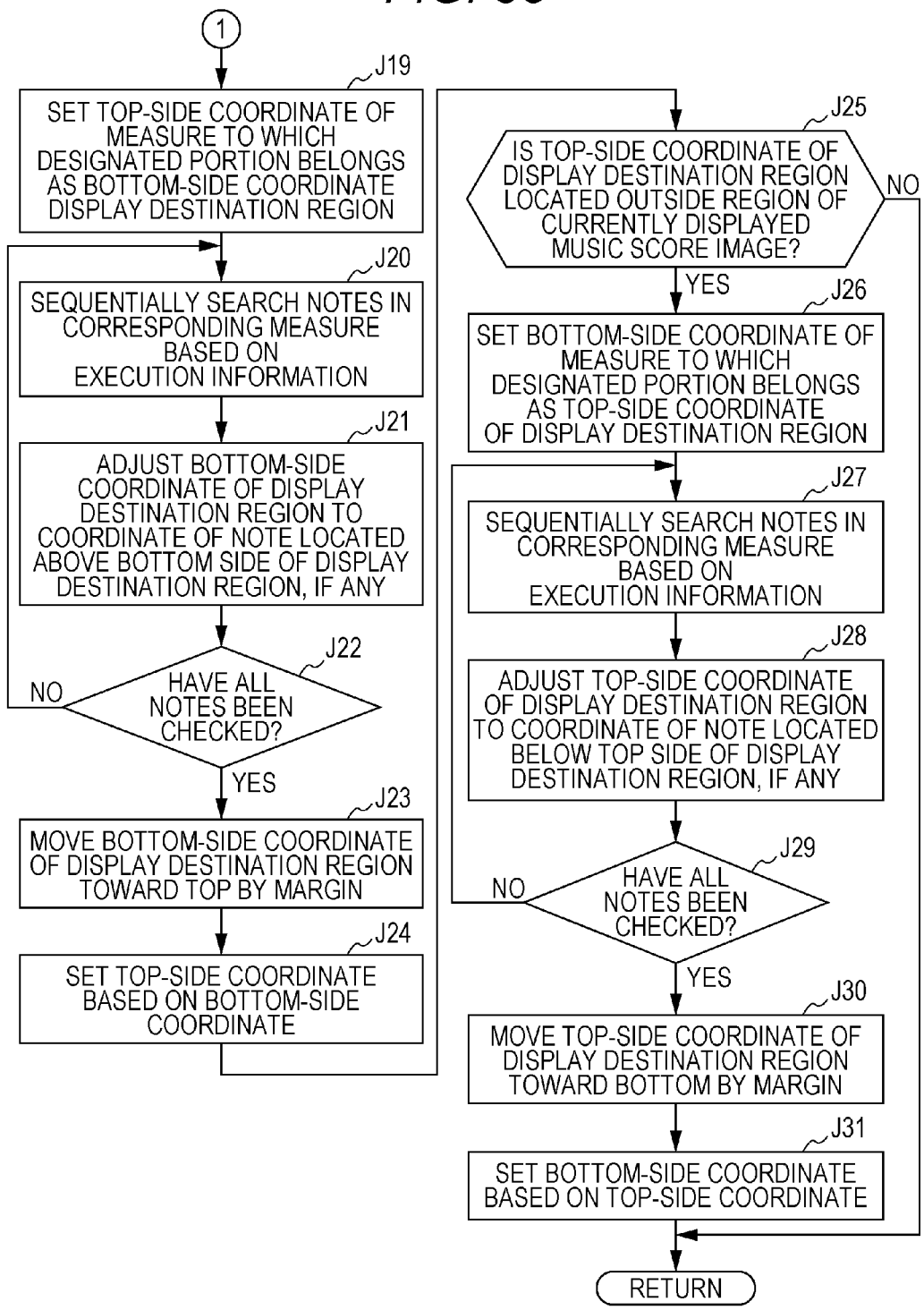
FIG. 35 is the continued flowchart showing the display destination region setting process (with the music score being taken into account) to be performed in step I18 shown in FIG. 33 according to the third embodiment.

FIGS. 34 and 35 are a flowchart showing the display destination region setting process (with the music score being taken into account) to be performed in step I18 shown in FIG. 33.

First, the CPU 11 acquires the coordinates of the portion 21 (the x-y coordinates of the designated point), which has been designated by the user on the display screen 42 (the screen of the display unit 15), in the source image 41 (step J11). The CPU 11 also replaces the size of the display destination region for enlarged display on the display screen 42 with a size in the source image 41 at a predetermined magnification (step J12).

The CPU 11 then acquires the coordinates (the x-coordinates of the right and left sides, and the y-coordinates of the top and bottom sides) of the four sides (the right side, the left side, the top side, and the bottom side) corresponding to the image region of the music score currently displayed on the screen in the source image 41 (step J13), and acquires the coordinates of the right side and the left side of the display destination region (rectangular region) from the x-coordinate of the designated portion 21 (step J14).

Specifically, where the coordinates of the designated portion 21 in the source image 41 are (xc, yc), and the width of the display destination region 23 is represented by destw, the positions that are horizontally shifted from the x-coordinate of the designated portion 21 by destw/2 on both sides are obtained as the coordinates (destRect.right, destRect.left) of the right side and the left side of the display destination region 23 (the rectangular region), as described above with reference to FIG. 18.

After obtaining the coordinates of the right side and the left side of the display destination region 23 (the rectangular region), the CPU 11 determines whether the display destination region 23 sticks out of the right or left side of the region of the currently displayed music score image. If the display destination region 23 sticks out of the left side of the music score image region (Yes in step J15), the CPU 11 moves the display destination region 23 to the right by the amount equivalent to the sticking-out portion (step J16). If the display destination region 23 sticks out of the right side of the music score image region (Yes in step J17), the CPU 11 moves the display destination region 23 to the left by the amount equivalent to the sticking-out portion (step J18).

After setting the coordinates of the right side and the left side of the display destination region 23 in the above manner, the CPU 11 determines the coordinates of the top side and the bottom side in accordance with the positional relationship with the measure to which the designated portion belongs in the manner described below.

First, the CPU 11 sets the coordinate of the top side of the measure to which the designated portion belongs as the coordinate of the bottom side of the display destination region 23 on the assumption that the display destination region 23 will be set above the portion designated by the user (step J19). The CPU 11 then sequentially searches the respective notes in the measure based on the execution information shown in FIG. 6 (step J20). If there is a note in a higher position than the coordinate of the bottom side of the display destination region 23, the CPU 11 adjusts the coordinate of the bottom side of the display destination region 23 to the position of the note (step J21).

The CPU 11 performs the same check as above for all the notes in the measure, and corrects the coordinate of the bottom side of the display destination region 23 as appropriate (Yes in step J22). The CPU 11 then determines the position further moved upward by a predetermined margin to be the coordinate of the bottom side of the display destination region 23 (step J23).

After determining the bottom-side coordinate of the display destination region 23, the CPU 11 sets the coordinate of the top side of the display destination region 23 based on the bottom-side coordinate (step J24).

Figure 36:
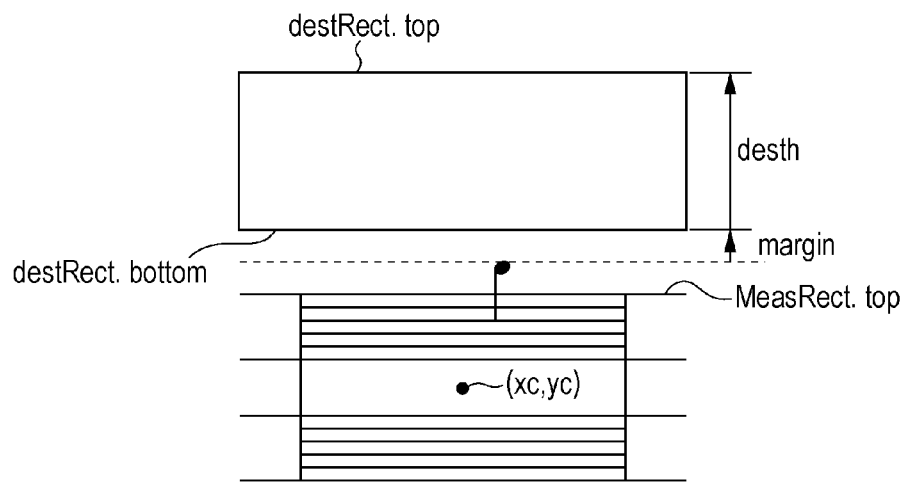
FIG. 36 is a diagram for explaining a display destination region that is set above a designated portion through the display destination region setting process (with the music score being taken into account) according to the third embodiment.

An example of such a situation is shown in FIG. 36.

In this example, the display destination region 23 is set above the coordinates (xc, yc) of a portion designated by the user. First, the top-side coordinate (MeasRect.top) of the measure to which the designated portion belongs is set as the bottom-side coordinate (destRect.bottom) of the display destination region 23.

At this point, the positions of the notes in the measure are checked. If there is a note in a higher position than the bottom-side coordinate (destRect.bottom) of the display destination region 23, the position that is moved upward by the amount equivalent to the total of the position of the head of the note and a predetermined margin is determined to be the ultimate bottom-side coordinate (destRect.bottom) of the display destination region 23. Further, the position that is moved upward from the bottom-side coordinate (destRect.bottom) by the height desth is the top-side coordinate (destRect.top) of the display destination region 23.

After setting the display destination region 23 above the portion designated by the user in the above manner, the CPU 11 determines whether this display destination region 23 is within the region of the currently displayed music score image. If the display destination region 23 is within the music score image region, the display destination region 23 is fixed in the position of the current coordinates.

If the display destination region 23 is not within the music score image region, or if the top-side coordinate of the display destination region 23 sticks out of the music score image region (Yes in step J25), the display destination region 23 is newly set below the portion designated by the user in the manner described below.

First, the CPU 11 sets the coordinate of the bottom side of the measure to which the designated portion belongs as the coordinate of the top side of the display destination region 23 (step J26). The CPU 11 then sequentially searches the respective notes in the measure based on the execution information shown in FIG. 6 (step J27). If there is a note in a lower position than the coordinate of the top side of the display destination region 23, the CPU 11 adjusts the coordinate of the top side of the display destination region 23 to the position of the note (step J28).

The CPU 11 performs the same check as above for all the notes in the measure, and corrects the coordinate of the top side of the display destination region 23 as appropriate (Yes in step J29). The CPU 11 then determines the position further moved downward by a predetermined margin to be the coordinate of the top side of the display destination region 23 (step J30).

After determining the top-side coordinate of the display destination region 23, the CPU 11 sets the coordinate of the bottom side of the display destination region 23 based on the top-side coordinate (step J31).

Figure 37:
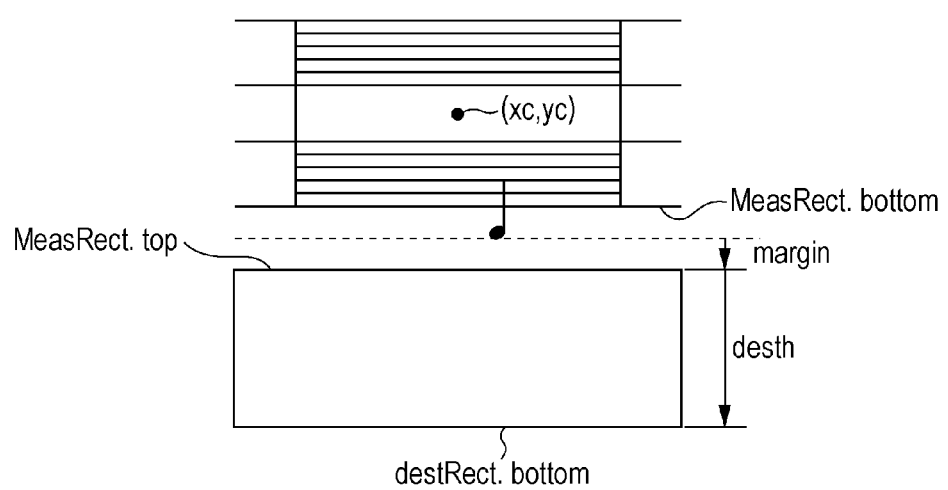
FIG. 37 is a diagram showing a display destination region that is set below a designated portion through the display destination region setting process (with the music score being taken into account) according to the third embodiment.

An example of such a situation is shown in FIG. 37.

In a case where the display destination region 23 is set below the coordinates (xc, yc) of a portion designated by the user, the bottom-side coordinate (MeasRect.bottom) of the measure to which the designated portion belongs is first set as the top-side coordinate (destRect.top) of the display destination region 23.

At this point, the positions of the notes in the measure are checked. If there is a note in a lower position than the top-side coordinate (destRect.top) of the display destination region 23, the position that is moved downward by the amount equivalent to the total of the position of the head of the note and a predetermined margin is determined to be the ultimate top-side coordinate (destRect.top) of the display destination region 23. Further, the position that is moved downward from the top-side coordinate (destRect.top) by the height desth is the bottom-side coordinate (destRect.bottom) of the display destination region 23.

After the display destination region 23 is set in this manner, the portion of the music score image 20 in the source region 22 is extracted, and is enlarged and displayed in the region corresponding to the display destination region 23 on the display screen 42, as described above with reference to steps F19 through F21 shown in FIG. 33. At this point, the region corresponding to the source region 22 on the display screen 42 is filled with a predetermined color.

As described above, according to the third embodiment, when the user designates a desired portion of a music score, a region as the enlarged display destination (the display destination region 23) is set so as to overlap neither the display of the entire measure including the designated portion nor the notes in the measure.

Specifically, the bottom side or the top side of the display destination region is first set based on the positional coordinates of the top side or the bottom side of the measure, so that the display destination region does not overlap the region of the measure when displayed. Further, the note of the highest pitch and the note of the lowest pitch in the measure are detected, and the region as the enlarged display destination (the display destination region 23) is set based on the positions of these notes.

Accordingly, when part of the music score is enlarged and displayed, the problem of the enlarged display hiding the portion designated by the user in the music score can be solved, and the music score can be studied by comparing the enlarged portion with the designated portion.

Although embodiments of the present invention have been described so far, these embodiments are merely examples, and are not intended to limit the scope of the invention. These novel embodiments can be realized in various other forms, and omissions, replacements, and modifications can be made without departing from the scope of the invention. These embodiments and modifications thereof are included in the spirit and scope of the invention, and are incorporated into the inventions disclosed in the claims and the equivalents thereof.

For example, various embodiments can be formed in regard to which stave in a music score is to be enlarged by the amount equivalent to how many staves in accordance with a portion designated by the user. In the case of a music score formed with a large number of staves for an orchestra, for example, if a portion designated by the use is not located in any stave, the staves located above and below the designated portion may be displayed, or a predetermined number of staves for the string section, the brass section, the woodwind section, and the like may be enlarged and displayed.

As for the source region 22, the region of measures in accordance with the portion designated by the user may be enlarged. For example, the measure including the portion designated by the user and the measure that follows the measure including the designated portion may be displayed.

As for the display destination region 23 and the source region 22, the size of one of these regions may be changed in accordance with the size of the other one. For example, if a measure region as a source region 22 is set in the second embodiment, a display destination region 23 that is suitable for enlarging the measure region may be set. By another method, after a display destination region 23 and a source region 22 are set, a display magnification (scale) may be determined in accordance with these two regions, and enlarged display may be conducted at the appropriate magnification.

Furthermore, the techniques disclosed in the above embodiments can be applied to various kinds of devices, when written as a computer-executable program onto storage media such as magnetic disks (flexible disks, hard disks, and the like), optical disks (CD-ROMs, DVDs, and the like), and semiconductor memories. The techniques disclosed in the above embodiments can also be applied to various kinds of devices, when transmitted via communication media. A computer that realizes the present device performs the above described processes by reading a program stored a storage medium and having its operation controlled by the program.

What is claimed is:

1. A music score display device comprising:
a displaying unit configured to display a music score on a display screen;
a designating unit configured to designate a portion of the music score displayed on the display screen of the displaying unit;
a source region setting unit configured to set a source region in the music score based on the portion designated by the designating unit, the source region in the music score being an object to be enlarged and displayed;
a display destination region setting unit configured to set, based on a predetermined setting condition, a display destination region of the display screen, the display destination region being separate from the source region, and the display destination region setting unit setting the display destination region such that (i) if the display destination region setting unit judges that the display destination region will stick out of a display region of the music score based on the predetermined setting condition, the display destination region setting unit sets the display destination region such that the display destination region falls within the display region of the music score, and (ii) if the display destination region setting unit judges that the display destination region will not stick out of the display region of the music score based on the predetermined setting condition, the display destination region setting unit sets the display destination region based on the predetermined setting condition; and
a display controlling unit configured to enlarge and display, in the display destination region, a partial music score included in the source region, the partial music score being a part of the music score included in the source region.

2. The music score display device according to claim 1, wherein the source region setting unit determines a measure in the music score to which the designated portion belongs, and sets the source region with the measure being the object to be enlarged and displayed.

3. The music score display device according to claim 1, wherein when the music score includes a plurality of parts, the source region setting unit sets the source region in accordance with a positional relationship between the designated portion and each of the parts.

4. The music score display device according to claim 3, wherein when the designated portion is located in a stave for one of the parts, the source region setting unit sets the source region with the one of the parts being the object to be enlarged and displayed.

5. The music score display device according to claim 3, wherein when the designated portion is located between staves for the parts, the source region setting unit sets the source region with all of the parts collectively being the object to be enlarged and displayed.

6. The music score display device according to claim 1, wherein the display destination region setting unit determines a measure in the music score to which the designated portion belongs, and sets the display destination region in a position not overlapping any note in the measure.

7. The music score display device according to claim 6, wherein the display destination region setting unit searches for a note in the measure, the note being one of a highest pitched note and a lowest pitched note in the measure, and sets the display destination region based on a position of the note.

8. The music score display device according to claim 1, wherein when the partial music score corresponding to the source region is enlarged and displayed in the display destination region, the display controlling unit causes the portion of the music score corresponding to the source region to be distinguishable from other portions of the music score.

9. A music score display method to be implemented in a music score display device connected to a music score data storing unit storing data of a music score, the music score display method comprising:

setting a source region in the music score stored in the music score data storing unit based on a portion designated in the music score displayed on a display screen, the source region being an object to be enlarged and displayed;

setting, based on a predetermined setting condition, a display destination region of the display screen, the display destination region being separate from the source region, and the display destination region being set such that (i) if it is judged that the display destination region will stick out of a display region of the music score based on the predetermined setting condition, the display destination region is set so as to fall within the display region of the music score, and (ii) if it is judged that the display destination region will not stick out of the display region of the music score based on the predetermined setting condition, the display destination region is set based on the predetermined setting condition; and enlarging and displaying, in the display destination region, a partial music score included in the source region, the partial music score being a part of the stored music score included in the source region.

10. A non-transitory computer-readable storage medium storing a music score display program to be executed by a computer connected to a music score data storing unit storing data of a music score, the program causing the computer to perform functions comprising:

setting a source region in the music score stored in the music score data storing unit based on a portion designated in the music score displayed on a display screen, the source region being an object to be enlarged and displayed;

setting, based on a predetermined setting condition, a display destination region of the display screen, the display destination region being separate from the source region, and the display destination region being set such that (i) if it is judged that the display destination region will stick out of a display region of the music score based on the predetermined setting condition, the display destination region is set so as to fall within the display region of the music score, and (ii) if it is judged that the display destination region will not stick out of the display region of the music score based on the predetermined setting condition, the display destination region is set based on the predetermined setting condition; and enlarging and displaying, in the display destination region, a partial music score included in the source region, the partial music score being a part of the stored music score included in the source region.

* * * * *